US012764810B2

(12) United States Patent
Huang et al.

(10) Patent No.: US 12,764,810 B2
(45) Date of Patent: Oct. 13, 2026

(54) DIRECT LINK ADDRESSING METHOD AND APPARATUS

(71) Applicant: HUAWEI TECHNOLOGIES CO., LTD., Shenzhen (CN)

(72) Inventors: Guogang Huang, Shenzhen (CN); Michael Montemurro, Ottawa (CA); Stephen Mccann, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 18/467,776

(22) Filed: Sep. 15, 2023

(65) Prior Publication Data

US 2024/0008113 A1 Jan. 4, 2024

Related U.S. Application Data

(63) Continuation of application No. PCT/CN2022/078704, filed on Mar. 2, 2022.

(30) Foreign Application Priority Data

Mar. 15, 2021 (CN) ......................... 202110278095.3

(51) Int. Cl.
*H04W 76/14* (2018.01)
*H04W 76/11* (2018.01)

(52) U.S. Cl.
CPC ............ *H04W 76/14* (2018.02); *H04W 76/11* (2018.02)

(58) Field of Classification Search
None
See application file for complete search history.

(56) References Cited

U.S. PATENT DOCUMENTS

2013/0166759 A1 6/2013 Rajamani et al.
2013/0266136 A1 10/2013 Chu et al.
2019/0082389 A1 3/2019 Wentink
2021/0014911 A1 1/2021 Patil et al.
(Continued)

FOREIGN PATENT DOCUMENTS

CN 105025592 A 11/2015
CN 113973400 A 1/2022
JP 2023552804 A 12/2023

OTHER PUBLICATIONS

International Search Report issued in corresponding International Application No. PCT/CN2022/078704, dated May 10, 2022, pp. 1-16.

(Continued)

*Primary Examiner* — Walter J Divito
(74) *Attorney, Agent, or Firm* — HAUPTMAN HAM, LLP

(57) ABSTRACT

A direct link addressing method and apparatus. Direct communication is performed between a non-AP MLD and a non-AP MLD, or between a STA device and a non-AP MLD, thereby improving data transmission efficiency. The method is applied to a first device, and the first device includes one or more stations STAs. The first device is connected to a third device, and the third device includes a plurality of access points APs. A second device is connected to the third device, and the second device includes a plurality of STAs. The first device transmits a first data unit over a direct link between the first device and the second device, thereby increasing a data transmission rate.

18 Claims, 12 Drawing Sheets

(56) References Cited

U.S. PATENT DOCUMENTS

| | | | | |
|---|---|---|---|---|
| 2021/0055645 | A1 | 2/2021 | Nishikawa et al. | |
| 2022/0124857 | A1* | 4/2022 | Patil | H04W 76/14 |

OTHER PUBLICATIONS

Taiwan Office Action issued in corresponding Taiwan Application No. 111108654, dated May 23, 2022, pp. 1-8.
Japanese Office Action issued in corresponding Japanese Application No. 2023-557218, dated Sep. 30, 2024, pp. 1-9.
Patil Abhishek et al: "Resolution for CIDs related to TDLS (CC34)", IEEE 802.11-21/00240R2, Feb. 11, 2021, XP093016811, total 9 pages.
Extended European Search Report issued in corresponding European Application No. 22770300.6, dated Jul. 22, 2024, pp. 1-10.
Australian Office Action issued in corresponding Australian Application No. 2022235791, dated Jul. 31, 2024, pp. 1-3.
Abhishek Patil (QUALCOMM): "TDLS handling in MLO", IEEE Draft; 11-20-1692-02-00BE-TDLS-HANDLING-IN-MLO, IEEE-SA Mentor, Piscataway, NJ USA, vol. 802.11 EHT; 802.11be, No. 23 Dec. 2020, pp. 1-25, XP068175375.
Rojan Chitrakar (PANASONIC): "Legacy addressing in MLO", IEEE Draft; 11-21-0228-00-00BE-LEGACY-ADDRESSING-INMLO, IEEE-SA Mentor, Piscataway, NJ USA, vol. 802.11 EHT; 802.11be, Feb. 22, 2021 (Feb. 22, 2021), pp. 1-22, XP068178812.
Guogang Huang (HUAWEI): "Reconsideration on STA MAC Address of Non-AP MLD", IEEE Draft 11-20-1890-01-00BE-RECONSIDERATION-ON STA-MAC-ADDRESS-OF-NON-AP-MLD, IEEE-SA Mentor, Pscaaway, NJ USA, vol. 802.11 EHT; 802.11be, No. 1 Feb. 3, 2021, pp. 1-15, XP068176138.
European Office Action issued in corresponding European Application No. 22 770 300.6, dated Sep. 4, 2025, pp. 1-10.
Japanese Office Action issued in JP2025-035619 dated Jan. 28, 2026.

* cited by examiner

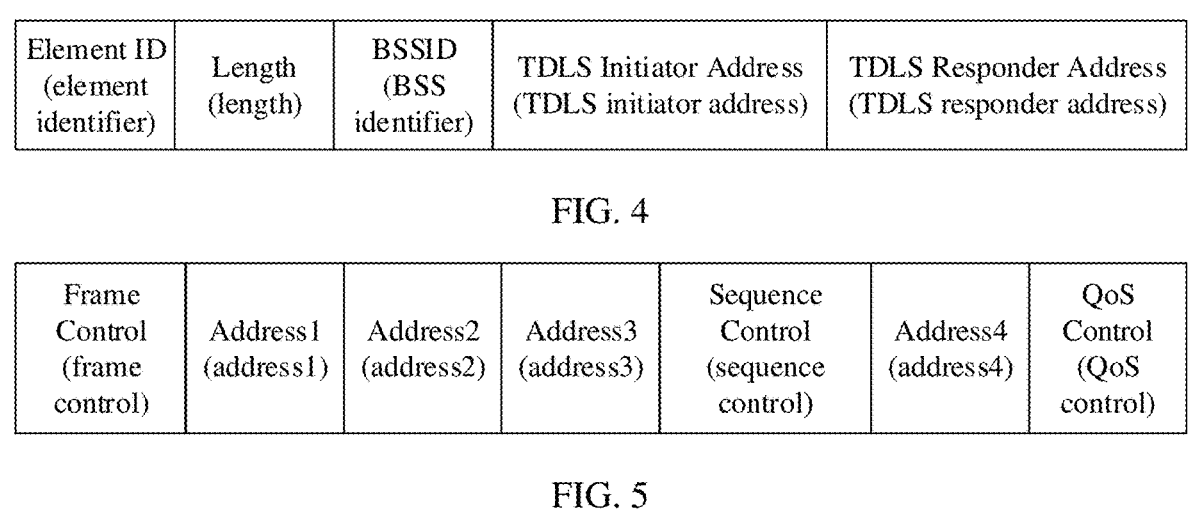

| | | | | |
|---|---|---|---|---|
| Element ID (element identifier) | Length (length) | BSSID (BSS identifier) | TDLS Initiator Address (TDLS initiator address) | TDLS Responder Address (TDLS responder address) |

FIG. 4

| | | | | | | |
|---|---|---|---|---|---|---|
| Frame Control (frame control) | Address1 (address1) | Address2 (address2) | Address3 (address3) | Sequence Control (sequence control) | Address4 (address4) | QoS Control (QoS control) |

FIG. 5

| Element ID (element identifier) | Length (length) | Offset (offset) | Interval (interval) | Awake window Slots (awake window slots) | Maximum Awake Window Duration (maximum awake window duration) | Idle Count (idle count) |
|---|---|---|---|---|---|---|

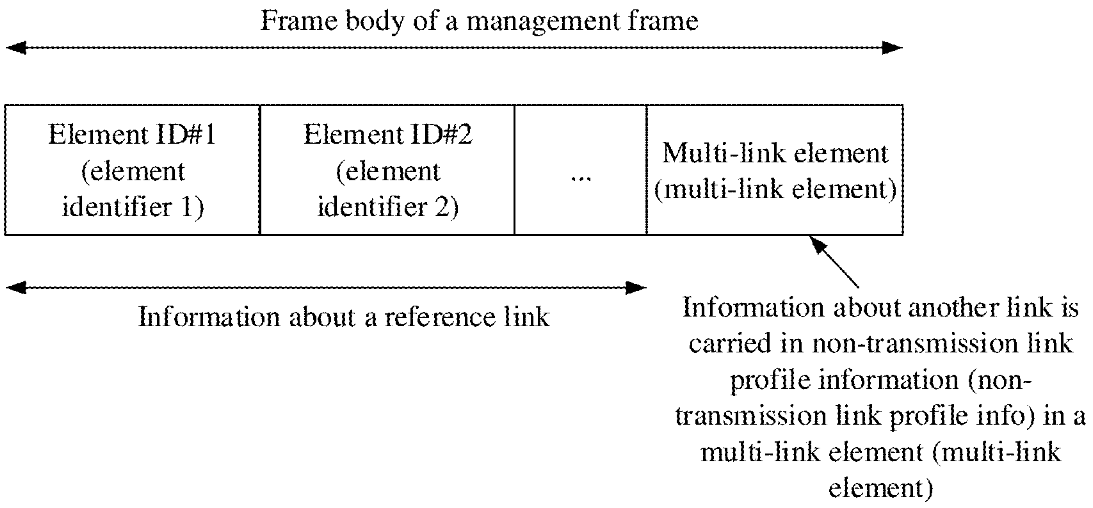
FIG. 13
| Element ID (element identifier) | Length (length) | Number of Direct links (number of direct links) | Direct link Identifier (direct link identifier) |
| --- | --- | --- | --- |
FIG. 14
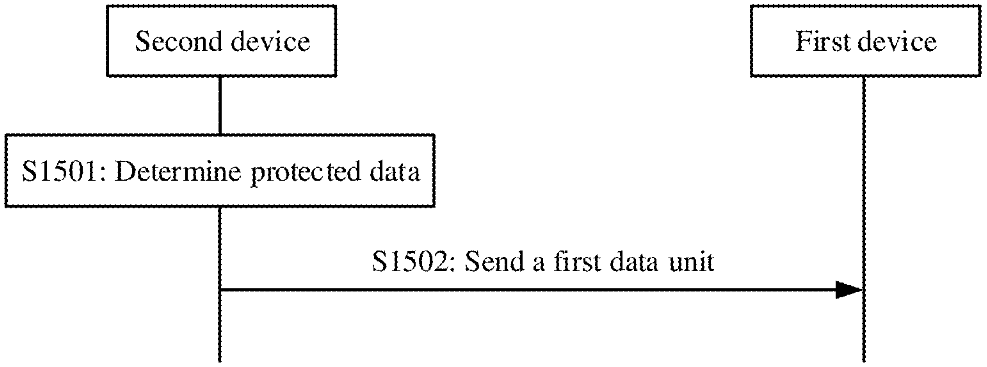
FIG. 15

DIRECT LINK ADDRESSING METHOD AND APPARATUS

CROSS-REFERENCE TO RELATED APPLICATIONS

This application is a continuation of International Application No. PCT/CN2022/078704, filed on Mar. 2, 2022, which claims priority to Chinese Patent Application No. 202110278095.3, filed on Mar. 15, 2021. The disclosures of the aforementioned applications are hereby incorporated by reference in their entireties.

BACKGROUND

With development of wireless communication technologies, increasing wireless communication devices support multi-link communication, to improve communication efficiency of the communication devices. A communication device supporting multi-link communication is referred to as a multi-link device (MLD). The multi-link device includes an access point (AP) MLD and a non-access point (non-AP) MLD. The AP MLD includes a plurality of APs, and the non-AP MLD includes a plurality of stations STAs. In response to a communication system including at least one AP MLD and a plurality of non-AP MLDs, a non-AP MLD communicates with an AP MLD over a plurality of links, and two non-AP MLDs communicates with each other by using an AP MLD. The communication system further includes a station (STA) device. The STA device includes one STA, and the STA device communicates with a non-AP MLD by using an AP MLD.

However, communication between the two non-AP MLDs or between the STA device and the non-AP MLD is still to be forwarded by using the AP MLD, which increases a transmission delay. For how to set up a direct link between a first non-AP MLD and a second non-AP MLD or between a STA device and a non-AP MLD for communication, there is no corresponding solution available in the industry.

SUMMARY

Embodiments described herein provide a direct link addressing method and apparatus, so that direct communication is performed between a non-AP MLD and a non-AP MLD, or between a STA device and a non-AP MLD, thereby improving data transmission efficiency.

To achieve the foregoing objective, at least one embodiment uses the following technical solutions.

According to a first aspect, a direct link addressing method is provided, applied to a first device. The first device includes one or more stations STAs. The first device is connected to a third device, and the third device includes a plurality of access points APs. A second device is connected to the third device, and the second device includes a plurality of STAs. The direct link addressing method includes: determining protected data, and sending a first data unit. The protected data includes a first address, a second address, and a third address. In response to the first device including one STA, the first address is an address of the second device, the second address is an address of the first device, the third address is an address of a first AP of the third device, and the first device is connected to the first AP of the third device. In response to the first device including a plurality of STAs, the first address is an address of the second device, the second address is an address of the first device, and the third address is an address of the third device. The first data unit includes a first header, the first header is determined based on the protected data, and the first data unit is transmitted over a direct link between the first device and the second device.

According to the direct link addressing method described in the first aspect, in response to the first device including one STA, the protected data is constructed by using the address of the first device, the address of the second device, and the address of the first AP connected to the first device. In response to the first device including a plurality of STAs, the protected data is constructed by using the address of the first device, the address of the second device, and the address of the third device. Therefore, the first device transmits the first data unit over the direct link between the first device and the second device, thereby increasing a data transmission rate. In addition, in response to the first device includes a plurality of STAs, the protected data is constructed by using the addresses of the devices, and a change of the direct link does not affect the protected data. Therefore, in response to data being transmitted across a plurality of direct links, encryption is not to be performed again, thereby further increasing the data transmission rate.

Optionally, the protected data is additional authentication data (AAD), and the first data unit is a management protocol data unit (MPDU).

In at least one embodiment, the first header includes a fourth address, a fifth address, and a sixth address. In response to the first device including one STA, the fourth address is an address of the second device, the fifth address is an address of the first device, and the sixth address is an address of the first AP of the third device. In this way, a legacy STA and the second device communicates over a direct link, thereby increasing a data transmission rate.

Optionally, the first header is an MPDU header.

In at least one embodiment, the first header includes a fourth address, a fifth address, and a sixth address. In response to the first device including a plurality of STAs, the fourth address is an address of a STA that corresponds to a first direct link and that is in the plurality of STAs of the second device, the fifth address is an address of a STA that corresponds to the first direct link and that is in the plurality of STAs of the first device, the sixth address is an address of an AP that corresponds to the first direct link and that is in the plurality of APs of the third device, and the first direct link is a direct link between the first device and the second device. In this way, a non-AP MLD and a non-AP MLD communicates over a direct link, thereby increasing a data transmission rate.

In at least one embodiment, the first data unit includes a tunneled direct-link setup (tunneled direct-link setup, TDLS) frame. The TDLS frame includes a first element, and the first element indicates an identifier of a target link or an address of an AP that corresponds to the target link and that is in the plurality of APs of the third device. The target link is a second direct link to which the TDLS frame is applied, and the second direct link is a direct link between the first device and the second device. In this way, for a link-level TDLS frame, a specific direct link to which the TDLS frame is applied is indicated.

Optionally, the TDLS frame is a TDLS channel switch request frame or a TDLS channel switch response frame. The TDLS channel switch request frame is used to request the target link to switch from a current channel to another channel, and the TDLS channel switch response frame indicates whether the target link agrees to switch from the current channel to the another channel. In this way, the first device and the second device switches the target link from the current channel to the another channel for communication. In a multi-link TDLS scenario, the TDLS channel switch request/response frame is transmitted over any direct link.

Optionally, the first element is a link identifier element, or a newly defined element.

In at least one embodiment, in response to the first device including one STA, and the TDLS frame is a TDLS discovery request frame, the first element indicates an identifier of a transmission link or an address of an AP that corresponds to the transmission link and that is in the plurality of APs of the third device, where the transmission link is a link for sending the TDLS discovery request frame. In this way, the legacy STA and the second device communicates over the direct link, thereby increasing the data transmission rate.

In at least one embodiment, in response to the first device including one STA, and the TDLS frame is a TDLS discovery response frame, the first element indicates an identifier of a transmission link or an address of an AP that corresponds to the transmission link and that is in the plurality of APs of the third device, where the transmission link is a link for sending the TDLS discovery request frame. In other words, configured content of the first element corresponding to the TDLS frame that is a TDLS discovery response frame is the same as configured content of the first element corresponding to the TDLS frame that is a TDLS discovery request frame. In this way, the legacy STA and the second device communicates over the direct link, thereby increasing the data transmission rate.

In at least one embodiment, in response to the first device including one STA, and the TDLS frame is a TDLS setup request frame, the first element indicates an identifier of a link between the first device and the third device, or an address of an AP that corresponds to the first device and that is in the plurality of APs of the third device, and the transmission link is a link for sending the TDLS discovery request frame. In this way, the legacy STA and the second device communicates over the direct link, thereby increasing the data transmission rate.

In at least one embodiment, in response to the first device including one STA, and the TDLS frame is a TDLS setup response frame, a TDLS setup confirm frame, a TDLS teardown frame, a TDLS channel switch request frame, a TDLS channel switch response frame, a TDLS peer power saving management request frame, a TDLS peer power saving management response frame, a TDLS peer traffic indication frame, or a TDLS peer traffic response frame, for a specific implementation of the first element, refer to the foregoing implementation of the first element in response to the first device including one STA and the TDLS frame is a TDLS setup request frame. Details are not described herein again. In this way, the non-AP MLD and the non-AP MLD communicates over the direct link, thereby increasing the data transmission rate.

In at least one embodiment, in response to the first device including a plurality of STAs, and the TDLS frame is a TDLS discovery request frame, the first element indicates an identifier of a reference link or an address of an AP that corresponds to the reference link and that is in the plurality of APs of the third device. Optionally, the reference link is a link indicated by a BSSID field in the link identifier element. In this way, the non-AP MLD and the non-AP MLD communicates over the direct link, thereby increasing the data transmission rate.

In at least one embodiment, in response to the first device including a plurality of STAs, and the TDLS frame is a TDLS discovery response frame, the first element indicates an identifier of a common link for transmitting the TDLS discovery response frame, or an address of an AP that corresponds to the common link for transmitting the TDLS discovery response frame and that is in the plurality of APs of the third device. The common link is a common link of a link between the first device and the third device and a link between the second device and the third device, and an AP of the third device associated with a STA of the first device corresponding to the common link is the same as an AP of the third device associated with a STA of the second device corresponding to the common link. In this way, the non-AP MLD and the non-AP MLD communicates over the direct link, thereby increasing the data transmission rate.

In at least one embodiment, in response to the first device including a plurality of STAs, and the TDLS frame is a TDLS setup request frame, a TDLS setup response frame, or a TDLS setup confirm frame, the first element indicates an identifier of a reference link, or an address of an AP that corresponds to the reference link and that is in the plurality of APs of the third device. In this way, a receive end knows a specific link is a corresponding reference link.

In at least one embodiment, in response to the first device including a plurality of STAs, and the TDLS frame is a TDLS teardown frame, the first element indicates an address of the third device. In this way, a receive end knows that the frame is sent by which device associated with which AP MLD.

In at least one embodiment, in response to the first device including a plurality of STAs, and the TDLS frame being a TDLS peer traffic indication frame or a TDLS peer traffic response frame, the first element indicates an address of the third device. In this way, a receive end knows that the frame is sent by which device associated with which AP MLD.

In at least one embodiment, the first data unit includes the tunneled direct-link setup TDLS frame, and the TDLS frame includes a wakeup schedule element and a second element. An offset field in the wakeup schedule element is an offset relative to a first timing synchronization function threshold of a third direct link, the second element indicates an identifier of the third direct link or an address of an AP that corresponds to the third direct link and that are in the plurality of APs of the third device, and the third direct link is a direct link between the first device and the second device. In this way, a time at which data is periodically woken up and received/sent is accurately learned, to reduce power consumption.

Optionally, the TDLS frame is a TDLS peer power saving management request frame or a TDLS peer power saving management response frame. In this way, in the multi-link TDLS scenario, the TDLS peer PSM request/response frame is transmitted over any direct link, and the receive end correctly parses the wakeup schedule element.

In at least one embodiment, the first data unit includes a third element, and the third element indicates to set up at least one fourth direct link on a first link. The first link is a common link of the link between the first device and the third device and the link between the second device and the third device, and the first link includes the at least one fourth direct link.

In this way, the first device and the second device sets up a direct link on the common link, to increase a data transmission rate.

In other words, the first link is a common link between the first device and the third device and between the second device and the third device, and an AP of the third device associated with a STA of the first device corresponding to the first link is the same as an AP of the third device associated with a STA of the second device corresponding to the first link.

In at least one embodiment, the third element includes a number of direct links field and a direct link identifier field, the number of direct links field indicates a quantity of fourth direct links requested to be set up, and the direct link identifier field includes an address of at least one AP that separately corresponds to the at least one fourth direct link and that is in the plurality of APs of the third device or an identifier of the at least one fourth direct link.

In this way, the quantity of fourth direct links to be set up is indicated, so that the fourth direct link is set up on some or all links of the first link, thereby improving flexibility of setting up a direct link. The direct link identifier field is used to indicate links on which direct links are set up.

In at least one embodiment, the direct link identifier field further includes an address of a first STA of the first device and an address of a second STA of the second device. In other words, the direct link identifier field includes addresses of affiliated STAs at two ends of the direct link.

In at least one embodiment, a seventh address is bound to a TDLS peer key (TPK), and the seventh address is an address of an AP that corresponds to the direct link between the first device and the second device and that is in the plurality of APs of the third device or addresses of all the APs of the third device, and the address of the third device. In this way, security of communication between the first device and the second device over the direct link is improved.

According to a second aspect, a direct link addressing method is provided, applied to a second device. The second device includes a plurality of stations STAs. The second device is connected to a third device, and the third device includes a plurality of access points APs. A first device is connected to the third device, and the first device includes one or more STAs. The direct link addressing method includes: receiving a first data unit, and parsing the first data unit to obtain a first header. The first data unit is transmitted over a direct link between the first device and the second device, and the first header includes a fourth address, a fifth address, and a sixth address. In response to the first device including one STA, the fourth address is an address of the second device, the fifth address is an address of the first device, and the sixth address is an address of a first AP of the third device. In response to the first device including a plurality of STAs, the fourth address is an address of a STA that corresponds to a first direct link and that is in the plurality of STAs of the second device, the fifth address is an address of a STA that corresponds to the first direct link and that is in the plurality of STAs of the first device, the sixth address is an address of an AP that corresponds to the first direct link and that is in the plurality of APs of the third device, and the first direct link is a direct link between the first device and the second device.

In at least one embodiment, the direct link addressing method provided in the second aspect further includes: obtaining protected data based on the first header. The protected data includes a first address, a second address, and a third address. In response to the first device including one STA, the first address is an address of the second device, the second address is an address of the first device, the third address is an address of the first AP of the third device, and the first device is connected to the first AP of the third device. In response to the first device including a plurality of STAs, the first address is an address of the second device, the second address is an address of the first device, and the third address is an address of the third device.

In at least one embodiment, the direct link addressing method provided in the second aspect further includes: parsing the first data unit to obtain a tunneled direct-link setup (TDLS) frame, where the TDLS frame includes a first element, the first element indicates an identifier of a target link or an address of an AP that corresponds to the target link and that is in the plurality of APs of the third device, the target link is a second direct link to which the TDLS frame is applied, and the second direct link is a direct link between the first device and the second device.

Optionally, the TDLS frame is a TDLS channel switch request frame or a TDLS channel switch response frame. The TDLS channel switch request is used to request the target link to switch from a current channel to another channel, and the TDLS channel switch response frame indicates whether the target link agrees to switch from the current channel to the another channel.

In at least one embodiment, in response to the first device including one STA, and the TDLS frame being a TDLS discovery request frame, the first element indicates an identifier of a transmission link or an address of an AP that corresponds to the transmission link and that is in the plurality of APs of the third device, where the transmission link is a link for sending the TDLS discovery request frame.

In at least one embodiment, in response to the first device including one STA, and the TDLS frame being a TDLS discovery response frame, the first element indicates an identifier of a transmission link or an address of an AP that corresponds to the transmission link and that is in the plurality of APs of the third device, where the transmission link is a link for sending the TDLS discovery request frame. In other words, configured content of the first element corresponding to the TDLS frame that is a TDLS discovery response frame is the same as configured content of the first element corresponding to the TDLS frame that is a TDLS discovery request frame.

In at least one embodiment, in response to the first device including one STA, and the TDLS frame being a TDLS setup request frame, the first element indicates an identifier of a link between the first device and the third device, or an address of an AP that corresponds to the first device and that is in the plurality of APs of the third device, and the transmission link is a link for sending the TDLS discovery request frame.

In at least one embodiment, in response to the first device including one STA, and the TDLS frame being a TDLS setup response frame, a TDLS setup confirm frame, a TDLS teardown frame, a TDLS channel switch request frame, a TDLS channel switch response frame, a TDLS peer power saving management request frame, a TDLS peer power saving management response frame, a TDLS peer traffic indication frame, or a TDLS peer traffic response frame, for a specific implementation of the first element, refer to the foregoing implementation of the first element in response to the first device including one STA and the TDLS frame being a TDLS setup request frame. Details are not described herein again.

In at least one embodiment, in response to the first device including a plurality of STAs, and the TDLS frame being a TDLS discovery request frame, the first element indicates an identifier of a reference link or an address of an AP that corresponds to the reference link and that is in the plurality of APs of the third device. Optionally, the reference link is a link indicated by a BSSID field in a link identifier element.

In at least one embodiment, in response to the first device including a plurality of STAs, and the TDLS frame being a TDLS discovery response frame, the first element indicates an identifier of a common link for transmitting the TDLS discovery response frame, or an address of an AP that corresponds to the common link for transmitting the TDLS discovery response frame and that is in the plurality of APs of the third device. The common link is a common link of a link between the first device and the third device and a link between the second device and the third device, and an AP of the third device associated with a STA of the first device corresponding to the common link is the same as an AP of the third device associated with a STA of the second device corresponding to the common link.

In at least one embodiment, in response to the first device including a plurality of STAs, and the TDLS frame being a TDLS setup request frame, a TDLS setup response frame, or a TDLS setup confirm frame, the first element indicates an identifier of a reference link, or an address of an AP that corresponds to the reference link and that is in the plurality of APs of the third device.

In at least one embodiment, in response to the first device including a plurality of STAs, and the TDLS frame being a TDLS teardown frame, the first element indicates an address of the third device.

In at least one embodiment, in response to the first device including a plurality of STAs, and the TDLS frame being a TDLS peer traffic indication frame or a TDLS peer traffic response frame, the first element indicates an address of the third device.

In at least one embodiment, the direct link addressing method provided in the second aspect further includes: parsing the first data unit to obtain the TDLS frame, where the TDLS frame includes a wakeup schedule element and a second element. An offset field in the wakeup schedule element is an offset relative to a first timing synchronization function threshold of a third direct link, the second element indicates an identifier of the third direct link or an address of an AP that corresponds to the third direct link and that are in the plurality of APs of the third device, and the third direct link is a direct link between the first device and the second device.

Optionally, the TDLS frame is a TDLS peer power saving management request frame or a TDLS peer power saving management response frame.

In at least one embodiment, the direct link addressing method provided in the second aspect further includes: parsing the first data unit to obtain a third element, where the third element indicates to set up at least one fourth direct link on a first link. The first link is a common link of the link between the first device and the third device and the link between the second device and the third device, and the first link includes the at least one fourth direct link.

In at least one embodiment, the third element includes a number of direct links field and a direct link identifier field, the number of direct links field indicates a quantity of fourth direct links requested to be set up, and the direct link identifier field includes an address of at least one AP that separately corresponds to the at least one fourth direct link and that is in the plurality of APs of the third device or an identifier of the at least one fourth direct link.

In at least one embodiment, the direct link identifier field further includes an address of a first STA of the first device and an address of a second STA of the second device.

In at least one embodiment, a seventh address is bound to a TDLS peer key, and the seventh address includes an address of an AP that corresponds to the direct link between the first device and the second device and that is in the plurality of APs of the third device or addresses of all the APs of the third device, and the address of the third device.

In addition, for a technical effect of the direct link addressing method according to the second aspect, refer to the technical effect of the direct link addressing method according to the first aspect. Details are not described herein again.

According to a third aspect, a direct link addressing method is provided, applied to a second device. The second device includes a plurality of stations STAs. The second device is connected to a third device, and the third device includes a plurality of access points APs. A first device is connected to the third device, and the first device includes one or more STAs. The direct link addressing method includes: determining protected data, and sending a first data unit. The protected data includes a first address, a second address, and a third address. In response to the first device including one STA, the first address is an address of the first device, the second address is an address of the second device, the third address is an address of a first AP of the third device, and the first device is connected to the first AP of the third device. In response to the first device including a plurality of STAs, the first address is an address of the first device, the second address is an address of the second device, and the third address is an address of the third device. The first data unit includes a first header, the first header is determined based on the protected data, and the first data unit is transmitted over a direct link between the first device and the second device.

In at least one embodiment, the first header includes a fourth address, a fifth address, and a sixth address. In response to the first device including one STA, the fourth address is an address of the first device, the fifth address is an address of the second device, and the sixth address is an address of the first AP of the third device. In this way, protocol compatibility is maintained. In response to the second device being used as a TDLS initiator, a legacy STA correctly parses the first data unit, so that the legacy STA communicates with a non-AP MLD over a direct link, thereby increasing a data transmission rate.

In at least one embodiment, the first header includes a fourth address, a fifth address, and a sixth address. In response to the first device including a plurality of STAs, the fourth address is an address of a STA that corresponds to a first direct link and that is in the plurality of STAs of the first device, the fifth address is an address of a STA that corresponds to the first direct link and that is in the plurality of STAs of the second device, the sixth address is an address of an AP that corresponds to the first direct link and that is in the plurality of APs of the third device, and the first direct link is a direct link between the first device and the second device.

In at least one embodiment, the first data unit includes a tunneled direct-link setup TDLS frame. The TDLS frame includes a first element, and the first element indicates an identifier of a target link or an address of an AP that corresponds to the target link and that is in the plurality of APs of the third device. The target link is a second direct link to which the TDLS frame is applied, and the second direct link is a direct link between the first device and the second device.

In at least one embodiment, the first data unit includes the tunneled direct-link setup TDLS frame, and the TDLS frame includes a wakeup schedule element and a second element. An offset field in the wakeup schedule element is an offset relative to a first timing synchronization function threshold of a third direct link, the second element indicates an identifier of the third direct link or an address of an AP that corresponds to the third direct link and that are in the plurality of APs of the third device, and the third direct link is a direct link between the first device and the second device.

In at least one embodiment, in response to the first device including one STA, and the TDLS frame being a TDLS discovery request frame, the first element indicates an identifier of a reference link or an address of an AP that corresponds to the reference link and that is in the plurality of APs of the third device. The reference link is a link indicated by a BSSID field in a link identifier element. In this way, protocol compatibility is maintained.

In at least one embodiment, in response to the first device including one STA, and the TDLS frame being a TDLS discovery response frame, the first element indicates an identifier of a transmission link or an address of an AP that corresponds to the transmission link and that is in the plurality of APs of the third device, where the transmission link is a link for sending the TDLS discovery request frame. In other words, configured content of the first element corresponding to the TDLS frame that is a TDLS discovery response frame is the same as configured content of the first element corresponding to the TDLS frame that is a TDLS discovery request frame. In this way, protocol compatibility is maintained.

In at least one embodiment, in response to the first device including one STA, and the TDLS frame being a TDLS setup request frame, the first element indicates an identifier of a link between the first device and the third device, or an address of an AP that corresponds to the first device and that is in the plurality of APs of the third device, and the transmission link is a link for sending the TDLS discovery request frame. In this way, protocol compatibility is maintained.

In at least one embodiment, in response to the first device including one STA, and the TDLS frame being a TDLS setup response frame, a TDLS setup confirm frame, a TDLS teardown frame, a TDLS channel switch request frame, a TDLS channel switch response frame, a TDLS peer power saving management request frame, a TDLS peer power saving management response frame, a TDLS peer traffic indication frame, or a TDLS peer traffic response frame, for a specific implementation of the first element, refer to the foregoing implementation of the first element in response to the first device including one STA and the TDLS frame being a TDLS setup request frame. Details are not described herein again. In this way, protocol compatibility is maintained.

In at least one embodiment, in response to the first device including a plurality of STAs, and the TDLS frame being a TDLS discovery request frame, the first element indicates an identifier of a reference link or an address of an AP that corresponds to the reference link and that is in the plurality of APs of the third device. Optionally, the reference link is a link indicated by a BSSID field in a link identifier element.

In at least one embodiment, in response to the first device including a plurality of STAs, and the TDLS frame being a TDLS discovery response frame, the first element indicates an identifier of a common link for transmitting the TDLS discovery response frame, or an address of an AP that corresponds to the common link for transmitting the TDLS discovery response frame and that is in the plurality of APs of the third device. The common link is a common link of a link between the first device and the third device and a link between the second device and the third device, and an AP of the third device associated with a STA of the first device corresponding to the common link is the same as an AP of the third device associated with a STA of the second device corresponding to the common link.

In at least one embodiment, in response to the first device including a plurality of STAs, and the TDLS frame being a TDLS setup request frame, a TDLS setup response frame, or a TDLS setup confirm frame, the first element indicates an identifier of a reference link, or an address of an AP that corresponds to the reference link and that is in the plurality of APs of the third device.

In at least one embodiment, in response to the first device including a plurality of STAs, and the TDLS frame being a TDLS teardown frame, the first element indicates an address of the third device.

In at least one embodiment, in response to the first device including a plurality of STAs, and the TDLS frame being a TDLS peer traffic indication frame or a TDLS peer traffic response frame, the first element indicates an address of the third device.

In at least one embodiment, the first data unit includes a third element, and the third element indicates to set up at least one fourth direct link on a first link. The first link is a common link of the link between the first device and the third device and the link between the second device and the third device, and the first link includes the at least one fourth direct link.

In at least one embodiment, the third element includes a number of direct links field and a direct link identifier field, the number of direct links field indicates a quantity of fourth direct links requested to be set up, and the direct link identifier field includes an address of at least one AP that separately corresponds to the at least one fourth direct link and that is in the plurality of APs of the third device or an identifier of the at least one fourth direct link.

In at least one embodiment, the direct link identifier field further includes an address of a first STA of the first device and an address of a second STA of the second device.

In at least one embodiment, a seventh address is bound to a TDLS peer key TPK, and the seventh address includes an address of an AP that corresponds to the direct link between the first device and the second device and that is in the plurality of APs of the third device or addresses of all the APs of the third device, and the address of the third device.

In addition, for a technical effect of the direct link addressing method according to the third aspect, refer to the technical effect of the direct link addressing method according to the first aspect. Details are not described herein again.

According to a fourth aspect, a direct link addressing method is provided, applied to a first device. The first device includes one or more station STAs. The first device is connected to a third device, and the third device includes a plurality of access points APs. A second device is connected to the third device, and the second device includes a plurality of STAs. The direct link addressing method includes: receiving a first data unit, and parsing the first data unit to obtain a first header. The first data unit is transmitted over a direct link between the first device and the second device. The first header includes a fourth address, a fifth address, and a sixth address. In response to the first device including one STA, the fourth address is an address of the first device, the fifth address is an address of the second device, and the sixth address is an address of a first AP of the third device. In response to the first device including a plurality of STAs, the fourth address is an address of a STA that corresponds to a first direct link and that is in the plurality of STAs of the first device, the fifth address is an address of a STA that corresponds to the first direct link and that is in the plurality of STAs of the second device, the sixth address is an address of an AP that corresponds to the first direct link and that is in the plurality of APs of the third device, and the first direct link is a direct link between the first device and the second device.

In at least one embodiment, the direct link addressing method provided in the fourth aspect further includes: obtaining protected data based on the first header. The protected data includes a first address, a second address, and a third address. In response to the first device including one STA, the first address is an address of the first device, the second address is an address of the second device, the third address is an address of the first AP of the third device, the first device is connected to the first AP of the third device, and the first device includes one STA. In response to the first device including a plurality of STAs, the first address is an address of the first device, the second address is an address of the second device, and the third address is an address of the third device.

In at least one embodiment, the direct link addressing method provided in the fourth aspect further includes: parsing the first data unit to obtain a tunneled direct-link setup TDLS frame, where the TDLS frame includes a first element, the first element indicates an identifier of a target link or an address of an AP that corresponds to the target link and that is in the plurality of APs of the third device, the target link is a second direct link to which the TDLS frame is applied, and the second direct link is a direct link between the first device and the second device.

In at least one embodiment, in response to the first device including one STA, and the TDLS frame being a TDLS discovery request frame, the first element indicates an identifier of a reference link or an address of an AP that corresponds to the reference link and that is in the plurality of APs of the third device. The reference link is a link indicated by a BSSID field in a link identifier element.

In at least one embodiment, in response to the first device including one STA, and the TDLS frame being a TDLS discovery response frame, the first element indicates an identifier of a transmission link or an address of an AP that corresponds to the transmission link and that is in the plurality of APs of the third device, where the transmission link is a link for sending the TDLS discovery request frame. In other words, configured content of the first element corresponding to the TDLS frame that is a TDLS discovery response frame is the same as configured content of the first element corresponding to the TDLS frame that is a TDLS discovery request frame.

In at least one embodiment, in response to the first device including one STA, and the TDLS frame being a TDLS setup request frame, the first element indicates an identifier of a link between the first device and the third device, or an address of an AP that corresponds to the first device and that is in the plurality of APs of the third device, and the transmission link is a link for sending the TDLS discovery request frame.

In at least one embodiment, in response to the first device including one STA, and the TDLS frame being a TDLS setup response frame, a TDLS setup confirm frame, a TDLS teardown frame, a TDLS channel switch request frame, a TDLS channel switch response frame, a TDLS peer power saving management request frame, a TDLS peer power saving management response frame, a TDLS peer traffic indication frame, or a TDLS peer traffic response frame, for a specific implementation of the first element, refer to the foregoing implementation of the first element in response to the first device including one STA and the TDLS frame being a TDLS setup request frame. Details are not described herein again.

In at least one embodiment, in response to the first device including a plurality of STAs, and the TDLS frame being a TDLS discovery request frame, the first element indicates an identifier of a reference link or an address of an AP that corresponds to the reference link and that is in the plurality of APs of the third device. Optionally, the reference link is a link indicated by a BSSID field in the link identifier element.

In at least one embodiment, in response to the first device including a plurality of STAs, and the TDLS frame being a TDLS discovery response frame, the first element indicates an identifier of a common link for transmitting the TDLS discovery response frame, or an address of an AP that corresponds to the common link for transmitting the TDLS discovery response frame and that is in the plurality of Aps of the third device. The common link is a common link of a link between the first device and the third device and a link between the second device and the third device, and an AP of the third device associated with a STA of the first device corresponding to the common link is the same as an AP of the third device associated with a STA of the second device corresponding to the common link.

In at least one embodiment, in response to the first device includes a plurality of STAs, and the TDLS frame being a TDLS setup request frame, a TDLS setup response frame, or a TDLS setup confirm frame, the first element indicates an identifier of a reference link, or an address of an AP that corresponds to the reference link and that is in the plurality of APs of the third device.

In at least one embodiment, in response to the first device including a plurality of STAs, and the TDLS frame being a TDLS teardown frame, the first element indicates an address of the third device.

In at least one embodiment, in response to the first device including a plurality of STAs, and the TDLS frame being a TDLS peer traffic indication frame or a TDLS peer traffic response frame, the first element indicates an address of the third device.

In at least one embodiment, the direct link addressing method provided in the fourth aspect further includes: parsing the first data unit to obtain the TDLS frame, where the TDLS frame includes a wakeup schedule element and a second element. An offset field in the wakeup schedule element is an offset relative to a first timing synchronization function threshold of a third direct link, the second element indicates an identifier of the third direct link or an address of an AP that corresponds to the third direct link and that are in the plurality of APs of the third device, and the third direct link is a direct link between the first device and the second device.

Optionally, the TDLS frame is a TDLS peer power saving management request frame or a TDLS peer power saving management response frame.

In at least one embodiment, the direct link addressing method provided in the fourth aspect further includes: parsing the first data unit to obtain a third element, where the third element indicates to set up at least one fourth direct link on a first link. The first link is a common link of the link between the first device and the third device and the link between the second device and the third device, and the first link includes the at least one fourth direct link.

In at least one embodiment, the third element includes a number of direct links field and a direct link identifier field, the number of direct links field indicates a quantity of fourth direct links requested to be set up, and the direct link identifier field includes an address of at least one AP that separately corresponds to the at least one fourth direct link and that is in the plurality of APs of the third device or an identifier of the at least one fourth direct link.

In at least one embodiment, the direct link identifier field further includes an address of a first STA of the first device and an address of a second STA of the second device.

In at least one embodiment, a seventh address is bound to a TDLS peer key TPK, and the seventh address includes an address of an AP that corresponds to the direct link between the first device and the second device and that is in the plurality of APs of the third device or addresses of all the APs of the third device, and the address of the third device.

In addition, for a technical effect of the direct link addressing method according to the fourth aspect, refer to the technical effect of the direct link addressing method according to the first aspect. Details are not described herein again.

According to a fifth aspect, a direct link addressing method is provided, applied to a first device. The first device includes one or more station STAs. The first device is connected to a third device, and the third device includes a plurality of access points APs. A second device is connected to the third device, and the second device includes a plurality of STAs. The direct link addressing method includes: determining a first data unit, and sending the first data unit. The first data unit includes a first header, and the first header includes a fourth address, a fifth address, and a sixth address.

In response to the first device including one STA, the fourth address is an address of the second device, the fifth address is an address of the first device, the sixth address is an address of a first AP of the third device, and the first device is connected to the first AP of the third device. In response to the first device including a plurality of STAs, the fourth address is an address of the second device, the fifth address is an address of the first device, and the sixth address is an address of an AP that corresponds to a sixth direct link and that is in the plurality of APs of the third device, where the sixth direct link is a link for transmitting the first data unit between the first device and the second device. The first data unit is transmitted over a direct link between the first device and the second device.

In at least one embodiment, the first data unit further includes a frame body, and the frame body is a TDLS frame or data.

Optionally, the TDLS frame is a TDLS discovery response frame.

According to the direct link addressing method provided in the fifth aspect, in response to the first device including one STA, the first header is constructed by using the address of the first device, the address of the second device, and the address of the first AP connected to the first device. In response to the first device including a plurality of STAs, the first header is constructed by using the address of the first device, the address of the second device, and the address of the AP that corresponds to the sixth direct link and that is in the plurality of APs of the third device, where the sixth direct link is a link for transmitting the TDLS frame between the first device and the second device. Therefore, the first device transmits the first data unit over the direct link between the first device and the second device, without forwarding by the third device, thereby increasing a data transmission rate. In addition, a manner of configuring the sixth address is the same in both a case in which the first device includes one STA and a case in which the first device includes a plurality of STAs, to avoid frequent modification of configured content of the sixth address, thereby further reducing a transmission delay.

Optionally, the TDLS frame is a TDLS discovery response frame. The TDLS discovery response frame is encapsulated into a common management frame, and is not encrypted. Therefore, corresponding AAD construction is not determined.

According to a sixth aspect, a direct link addressing method is provided, applied to a second device. The second device includes a plurality of stations STAs. The second device is connected to a third device, and the third device includes a plurality of access points APs. A first device is connected to the third device, and the first device includes one or more STAs. The direct link addressing method includes: receiving a first data unit, and parsing the first data unit to obtain a first header. The first header includes a fourth address, a fifth address, and a sixth address.

In response to the first device including one STA, the fourth address is an address of the second device, the fifth address is an address of the first device, the sixth address is an address of a first AP of the third device, and the first device is connected to the first AP of the third device. In response to the first device including a plurality of STAs, the fourth address is an address of the second device, the fifth address is an address of the first device, and the sixth address is an address of an AP that corresponds to a sixth direct link and that is in the plurality of APs of the third device, where the sixth direct link is a link for transmitting the first data unit between the first device and the second device. The first data unit is transmitted over a direct link between the first device and the second device.

In at least one embodiment, the direct link addressing method provided in the sixth aspect further includes: parsing the first data unit to obtain a frame body, where the frame body is a TDLS frame or data.

Optionally, the TDLS frame is a TDLS discovery response frame.

In addition, for a technical effect of the direct link addressing method according to the sixth aspect, refer to the technical effect of the direct link addressing method according to the fifth aspect. Details are not described herein again.

According to a seventh aspect, a direct link addressing method is provided, applied to a second device. The second device includes a plurality of stations STAs. The second device is connected to a third device, and the third device includes a plurality of access points APs. A first device is connected to the third device, and the first device includes one or more STAs. The direct link addressing method includes: determining a first data unit, and sending the first data unit. The first data unit includes a first header, and the first header includes a fourth address, a fifth address, and a sixth address.

In response to the first device including one STA, the fourth address is an address of the first device, the fifth address is an address of the second device, the sixth address is an address of a first AP of the third device, and the first device is connected to the first AP of the third device. In response to the first device including a plurality of STAs, the fourth address is an address of the first device, the fifth address is an address of the second device, and the sixth address is an address of an AP that corresponds to a sixth direct link and that is in the plurality of APs of the third device, where the sixth direct link is a link for transmitting the first data unit between the first device and the second device. The first data unit is transmitted over a direct link between the first device and the second device.

In at least one embodiment, the first data unit further includes a frame body, and the frame body is a TDLS frame or data.

Optionally, the TDLS frame is a TDLS discovery response frame.

In addition, for a technical effect of the direct link addressing method according to the seventh aspect, refer to the technical effect of the direct link addressing method according to the fifth aspect. Details are not described herein again.

According to an eighth aspect, a direct link addressing method is provided, applied to a first device. The first device includes one or more station STAs. The first device is connected to a third device, and the third device includes a plurality of access points APs. A second device is connected to the third device, and the second device includes a plurality of STAs. The direct link addressing method includes: receiving a first data unit, and parsing the first data unit to obtain a first header. The first header includes a fourth address, a fifth address, and a sixth address.

In response to the first device including one STA, the fourth address is an address of the first device, the fifth address is an address of the second device, the sixth address is an address of a first AP of the third device, and the first device is connected to the first AP of the third device. In response to the first device including a plurality of STAs, the fourth address is an address of the first device, the fifth address is an address of the second device, and the sixth address is an address of an AP that corresponds to a sixth direct link and that is in the plurality of APs of the third device, where the sixth direct link is a link for transmitting the first data unit between the first device and the second device. The first data unit is transmitted over a direct link between the first device and the second device.

In at least one embodiment, the direct link addressing method provided in the eighth aspect further includes: parsing the first data unit to obtain a frame body, where the frame body is a TDLS frame or data.

Optionally, the TDLS frame is a TDLS discovery response frame.

In addition, for a technical effect of the direct link addressing method according to the eighth aspect, refer to the technical effect of the direct link addressing method according to the fifth aspect. Details are not described herein again.

According to a ninth aspect, a direct link addressing apparatus is provided. The direct link addressing apparatus includes units or modules configured to perform the method according to any one of the first aspect, the fourth aspect, the fifth aspect, or the eighth aspect.

In at least one embodiment, the direct link addressing apparatus according to the ninth aspect is the first device, or a chip (system) or another component or assembly that is disposed in the first device.

In addition, for a technical effect of the direct link addressing apparatus according to the ninth aspect, refer to the technical effect of the direct link addressing method according to any implementation of the first aspect or the fifth aspect. Details are not described herein again.

According to a tenth aspect, a direct link addressing apparatus is provided. The direct link addressing apparatus includes units or modules configured to perform the method according to any one of the second aspect, the third aspect, the sixth aspect, or the seventh aspect.

In at least one embodiment, the direct link addressing apparatus according to the tenth aspect is the second device, or a chip (system) or another component or assembly that is disposed in the second device.

In addition, for a technical effect of the direct link addressing apparatus according to the tenth aspect, refer to the technical effect of the direct link addressing method according to any implementation of the first aspect or the fifth aspect. Details are not described herein again.

According to an eleventh aspect, a direct link addressing apparatus is provided. The direct link addressing apparatus includes a processor, the processor is coupled to a memory, and the memory is configured to store computer programs. The processor is configured to execute the computer programs stored in the memory, so that the direct link addressing apparatus performs the direct link addressing method according to any one of the implementations of the first aspect to the eighth aspect.

In at least one embodiment, the direct link addressing apparatus according to the eleventh aspect further includes a transceiver. The transceiver is a transceiver circuit or an input/output port. The transceiver is used by the direct link addressing apparatus to communicate with another device.

In at least one embodiment, the direct link addressing apparatus according to the eleventh aspect is the first device, the second device, or a chip or a chip system disposed inside the first device or the second device.

In addition, for a technical effect of the direct link addressing apparatus according to the eleventh aspect, refer to the technical effect of the direct link addressing method according to any implementation of the first aspect to the eighth aspect. Details are not described herein again.

According to a twelfth aspect, a communication system is provided. The communication system includes a first device and a second device.

According to a thirteenth aspect, a chip system is provided. The chip system includes a processor and an input/output port, the processor is configured to implement processing functions in the first aspect to the eighth aspect, and the input/output port is configured to implement transceiver functions in the first aspect to the eighth aspect.

In at least one embodiment, the chip system further includes a memory. The memory is configured to store program instructions and data that implement functions in the first aspect to the eighth aspect.

The chip system includes a chip, or includes a chip and another discrete component.

According to a fourteenth aspect, a computer-readable storage medium is provided, including computer programs or instructions. In response to the computer programs or the instructions being run on a computer, the computer is enabled to perform the direct link addressing method according to any one of the implementations of the first aspect to the eighth aspect.

According to a fifteenth aspect, a computer program product is provided, including computer programs or instructions. In response to the computer programs or the instructions being run on a computer, the computer is enabled to perform the direct link addressing method according to any one of the implementations of the first aspect to the eighth aspect.

BRIEF DESCRIPTION OF DRAWINGS

FIG. 4 is a schematic diagram of a frame structure of a link identifier element according to at least one embodiment;

FIG. 5 is a schematic diagram of a frame structure of AAD according to at least one embodiment;

FIG. 13 is a schematic diagram of a frame structure of a frame body according to at least one embodiment;

FIG. 14 is a schematic diagram of a frame structure of a TDLS link info element according to at least one embodiment;

FIG. 15 is a schematic flowchart of another direct link addressing method according to at least one embodiment;

DESCRIPTION OF EMBODIMENTS

Figure 1:
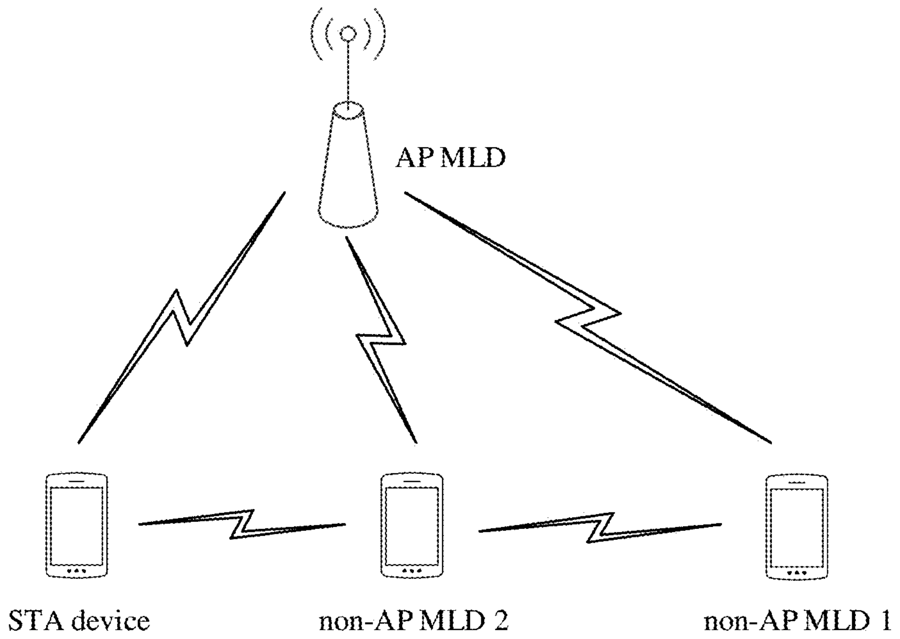
FIG. 1 is a schematic diagram of an architecture of a communication system according to at least one embodiment.

In embodiments described herein, unless otherwise specified, "/" means "or". For example, A/B represents A or B. A term "and/or" in this specification describes only an association relationship between associated objects and indicates that there is three relationships. For example, A and/or B indicates the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

All aspects, embodiments, or features are presented by describing a system that includes a plurality of devices, components, modules, and the like. Each system includes another device, component, module, and the like, and/or does not include all devices, components, modules, and the like discussed with reference to accompanying drawings. In addition, a combination of these solutions are used.

In at least one embodiment, the word such as "example" or "for example" is used to represent giving an example, an illustration, or a description. Any embodiment or design scheme described as an "example" or "for example" in at least one embodiment should not be explained as being more preferable or having more advantages than another embodiment or design scheme. Exactly, use of the word such as "example" or "for example" is intended to present a related concept in a specific manner.

A multi-link device (MLD) includes one or more affiliated stations, and the affiliated station is a logical station. "A multi-link device includes an affiliated station" is also briefly described as "A multi-link device includes a station" in embodiments described herein. The affiliated STA is an AP or a non-access point station (non-AP STA). For ease of description, in at least one embodiment, a multi-link device whose affiliated station is an AP is referred to as an AP MLD, a multi-link AP, a multi-link AP device, or an access point AP. A single-link device whose affiliated station is an AP is referred to as an AP device, an access point, an AP, a single-link AP device, or an access point AP. A multi-link device whose affiliated station is a non-AP STA is referred to as a non-AP MLD, a multi-link STA, a multi-link STA device, a STA MLD, or the like. A single-link device whose affiliated station is a non-AP STA is referred to as a STA device, a station, a STA, a non-AP STA, or the like.

Technical solutions in embodiments described herein is applied to various communication systems, for example, a system using the IEEE 802.11 standard. For example, the IEEE 802.11 standard includes but is not limited to the 802.11be standard or the next-generation 802.11 standard. Scenarios to which the technical solutions of at least one embodiment are applicable include: communication between a non-AP MLD and an AP MLD, communication between a STA device and an AP MLD, communication between a non-AP MLD and a non-AP MLD, and communication between a STA device and a non-AP MLD.

The multi-link device MLD implements wireless communication in compliance with IEEE 802.11 series protocols, for example, in compliance with an extremely high throughput (EHT) protocol, or in compliance with an 802.11be-based or 802.11be-compatible protocol, thereby implementing communication with another device. Certainly, the another device is a multi-link device or is not a multi-link device.

A network architecture and a service scenario described in embodiments described herein are intended to describe the technical solutions in embodiments described herein more clearly, and do not constitute a limitation on the technical solutions provided in embodiments described herein. A person of ordinary skill in the art knows that: With the evolution of the network architecture and emergence of new service scenarios, the technical solutions provided in embodiments described herein are also applicable to similar technical problems.

For ease of understanding embodiments described herein, a communication system shown in FIG. 1 is first used as an example to describe in detail a communication system applicable to embodiments described herein. For example, FIG. 1 is a schematic diagram of an architecture of a communication system to which a direct link addressing method according to at least one embodiment is applicable.

As shown in FIG. 1, the communication system includes at least one AP MLD, and at least one non-AP MLD such as a non-AP MLD 1 and a non-AP MLD 2. Optionally, the communication system further includes at least one STA device. The AP MLD includes a plurality of APs, the non-AP MLD includes a plurality of STAs, the STA device includes one STA, and the STA device is referred to as a legacy STA.

The AP MLD is an apparatus that is deployed in a wireless communication network and that provides a wireless communication function for a STA associated with the AP MLD. The AP MLD includes but is not limited to: an access point (AP) in a wireless fidelity (wireless fidelity, Wi-Fi) system, such as a home gateway, a router, a server, a switch, and a bridge, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless relay node, a wireless backhaul node, a transmission and reception point (transmission and reception point, TRP; or transmission point, TP), or the like. The AP MLD is alternatively a gNB or a transmission and reception point (TRP or TP) in a 5G system, for example, a new radio (new radio, NR) system, or one antenna panel or a group of antenna panels (including a plurality of antenna panels) of a base station in a 5G system. The AP MLD is alternatively a network node, such as a baseband unit (BBU), a distributed unit (DU), or a road side unit (RSU) having a base station function, that constitutes a gNB or a transmission and reception point.

The non-AP MLD or the STA device is a terminal that accesses the communication system and has a wireless transceiver function, or a chip or chip system that is disposed in the terminal. The terminal device is also referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments described herein is a mobile phone, a tablet computer (Pad), a computer having a wireless transceiver function, a virtual reality (VR) terminal device, an augmented reality (AR) terminal device, a wireless terminal in industrial control, a wireless terminal in self driving, a wireless terminal in telemedicine, a wireless terminal in smart grid, a wireless terminal in transportation safety, a wireless terminal in smart city, a wireless terminal in smart home, a vehicle-mounted terminal, an RSU that has a terminal function, or the like. The terminal device in at least one embodiment alternatively is a vehicle-mounted module, a vehicle-mounted component, a vehicle-mounted chip, or a vehicle-mounted unit that is built in a vehicle as one or more components or units. The vehicle implements the direct link addressing method provided in at least one embodiment by using the built-in vehicle-mounted module, vehicle-mounted component, vehicle-mounted chip, or vehicle-mounted unit.

The direct link addressing method provided in embodiments described herein is applicable to any two nodes shown in FIG. 1. For specific implementation, refer to the following method embodiments. Details are not described herein.

The solutions in embodiments described herein is also used in another communication system, and a corresponding name is also replaced with a name of a corresponding function in the another communication system.

FIG. 1 is merely a simplified schematic diagram of an example for ease of understanding. The communication system further includes another device not drawn in FIG. 1.

A frequency band on which the multi-link device operates includes but is not limited to: sub 1 GHz (sub 1 GHz), 2.4 GHz, 5 GHz, 6 GHz, and a high frequency 60 GHz. In addition, an MLD communicates through a plurality of channels in a same frequency band. The plurality of frequency bands or the plurality of channels is collectively referred to as a multi-link. A peak throughput is increased in a multi-link communication manner, a service transmission delay is reduced, and a rate of communication between MLDs is increased.

Figure 2:
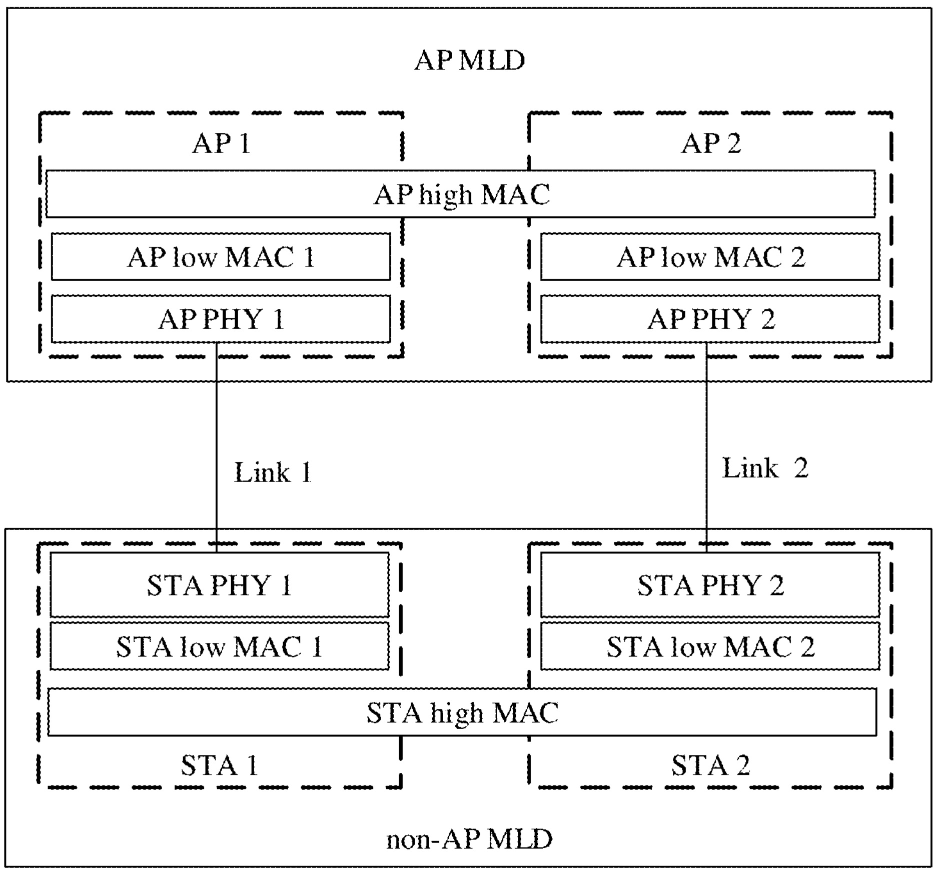
FIG. 2 is a schematic diagram of a structure of an AP MLD and a non-AP MLD that participate in communication according to at least one embodiment.

FIG. 2 shows a schematic diagram of a structure of an AP MLD and a non-AP MLD that participate in communication. As shown in FIG. 2, the AP MLD includes an affiliated AP 1 and an affiliated AP 2. The AP 1 and the AP 2 are independent of each other at a low media access control (MAC) layer and a physical layer (PHY), and share a high MAC layer. The non-AP MLD includes an affiliated STA 1 and an affiliated STA 2. The STA 1 and the STA 2 are independent of each other at a low MAC layer and a PHY layer, and share a high MAC layer. The AP MLD and the non-AP MLD communicates over a link 1 and a link 2. One end of the link 1 is connected to the AP 1 of the AP MLD, and the other end of the link 1 is connected to the STA 1 of the non-AP MLD. One end of the link 2 is connected to the AP 2 of the AP MLD, and the other end of the link 2 is connected to the STA 2 of the non-AP MLD.

A multi-link device corresponds to a multi-link device address, and each link of the multi-link device corresponds to a respective link address. The AP MLD is used as an example. The multi-link device address is an AP MLD MAC address. The non-AP MLD is used as an example. The multi-link device address is a STA MLD MAC address. A link address between the AP MLD and the non-AP MLD includes an affiliated AP MAC address and an affiliated STA MAC address that correspond to two ends of a link.

FIG. 2 shows that the AP MLD and the non-AP MLD operate on only the two links. A quantity of links on which the AP MLD and the non-AP MLD operate is not limited in at least one embodiment.

For example, the multi-link device is an apparatus having a wireless communication function. The apparatus is a device of an entire system, or is a chip, a processing system, or the like installed in the device of the entire system. The device on which the chip or the processing system is installed is controlled by the chip or the processing system, to implement the method and functions in embodiments described herein.

Figure 3:
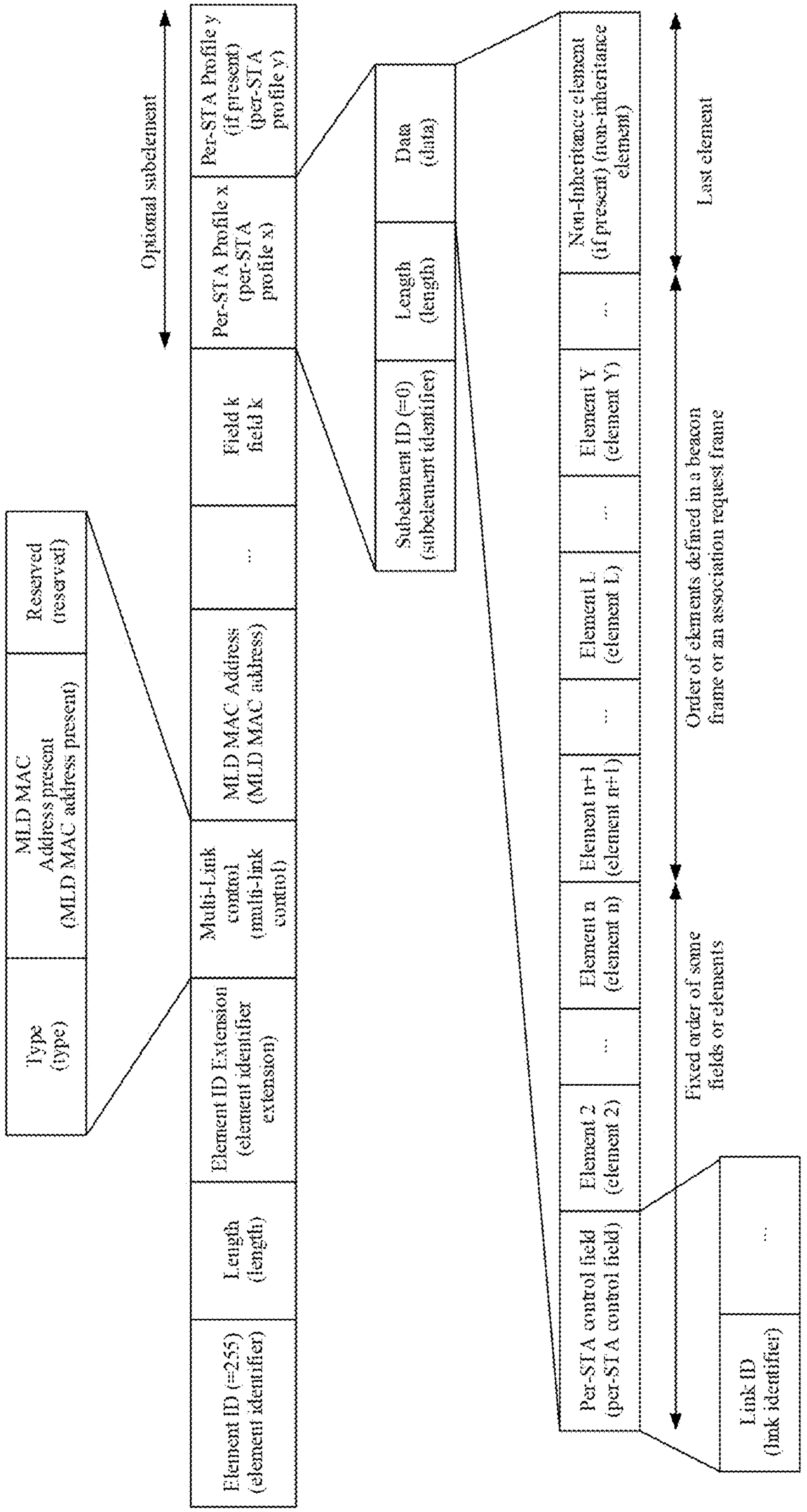
FIG. 3 is a schematic diagram of a frame structure of a multi-link element according to at least one embodiment.

The following specifically describes setup of a plurality of links between the non-AP MLD and the AP MLD with reference to FIG. 2 and FIG. 3.

The non-AP MLD performs a multi-link setup operation over one of the links to simultaneously associate a plurality of links of the AP MLD. In an association process, the non-AP MLD and the AP MLD exchange an association request/response frame over one link. A link used to exchange the association request/response frame is referred to as a transmission link, and another link is a non-transmission link. The association request/response frame carries information about the plurality of links that are to be associated, to simultaneously associate the plurality of links between the non-AP MLD and the AP MLD.

For example, with reference to FIG. 2, the non-AP MLD sends an association request frame over the link 1, where the association request frame carries STA information of the link 1 and STA information of the link 2. Link 1 is referred to as a transmission link, and the link 2 is referred to as a non-transmission link. The AP MLD sends an association response frame to the non-AP MLD over the link 1, where the association response frame carries AP information of the link 1 and AP information of the link 2. Therefore, the non-AP MLD and the AP MLD establish association over the link 1 and the link 2. Further, the non-AP MLD and the AP MLD transmits data over the link 1 and the link 2.

To perform a multi-link operation, related information of the plurality of links is indicated in a frame related to the multi-link operation. Therefore, a protocol defines a multi-link element. For example, as shown in FIG. 3, information carried in the multi-link element is mainly divided into two parts. One part is multi-link device-level information (MLD-level info) including fields such as a multi-link control field and an MLD MAC address field, and the other part is per-station information (Per-STA Profile) which carries related information of a non-transmission link. The per-STA profile indicates a link identifier (Link ID) of a corresponding link, and the link identifier indicates information about a related STA over the link corresponding to the per-STA profile. The MLD MAC address field carries an MLD MAC address of a transmit end.

To reduce signaling overheads, the multi-link element uses an inheritance structure. In response to content of a corresponding element in a non-transmission link being the same as content of a corresponding element in a transmission link, the corresponding element in the non-transmission link is not carried in a per-STA profile of the link. The per-STA profile of the link is carried only in response to the content of the corresponding element in the non-transmission link being different from the content of the corresponding element in the transmission link.

A specific format of the multi-link element is not limited to that shown in FIG. 3, and a specific format of a link identifier element is not limited in at least one embodiment.

The non-AP MLD obtains, by receiving a probe response frame or a beacon frame, link information (for example, a link identifier) corresponding to each link, and further obtains a channel on which each link operates and an address of each link, for example, a basic service set identifier (BSSID) of the link.

The following specifically describes tunneled direct-link setup (TDLS) between two STA devices with reference to Table 1 and FIG. 4. FIG. 4 is a schematic diagram of a frame structure of a link identifier element according to at least one embodiment.

A first STA device and a second STA device are connected to a same AP device, the first STA device includes one STA, and the second STA device includes one STA. In response to the first STA device and the second STA device being in a wireless communication reachable range, a direct link is set up between the first STA device and the second STA device, so that the first STA device and the second STA device directly communicates with each other over the direct link without forwarding by using the AP device, thereby improving a data transmission rate and reducing a delay.

For example, TDLS-related operations include but are not limited to one or more of the following: TDLS discovery, TDLS setup, TDLS teardown, TDLS channel switch, TDLS power saving, and TDLS traffic indication. TDLS frames corresponding to the TDLS-related operations are shown in the following Table 1. In at least one embodiment, the TDLS frame includes a TDLS action frame and a TDLS public action frame. For example, with reference to the following Table 1, a TDLS discovery response frame belongs to the TDLS public action frame, and all TDLS frames except the TDLS discovery response frame belong to the TDLS action frame.

The first STA device and the second STA device implements corresponding TDLS-related operations by exchanging TDLS frames. For example, the first STA device and the second STA device implements TDLS power saving by exchanging a TDLS peer power saving management request frame (TDLS Peer PSM Request frame) and a TDLS peer power saving management response frame (TDLS Peer PSM Response frame). Alternatively, the first STA device or the second STA device implements a corresponding TDLS-related operation by using a TDLS frame. For example, the first STA device implements TDLS teardown by using a TDLS teardown frame.

A transmission mode of a TDLS frame includes: forwarding via AP or direct transmission. Forwarding via AP indicates that a TDLS frame in this transmission mode is to be used to forward data between the first STA device and the second STA device via the AP. The direct transmission indicates that the TDLS frame in this transmission mode is transmitted from one STA device to another STA device over a direct link between the STA devices, and is not to be forwarded by an AP device. Some TDLS frames or a TDLS frame is transmitted in one or two (both allowed) manners. For details, refer to the following Table 1. Details are not enumerated herein.

In response to the TDLS frame being forwarded via the AP device or sent over the direct link, the TDLS frame is encapsulated into a data frame or a management frame for sending. Specifically, the TDLS action frame is encapsulated into a data frame for sending, and the TDLS public action frame is directly sent in a form of a management frame. For details, refer to the following Table 1. Details are not enumerated herein.

TABLE 1

| TDLS frame | Transmission mode | Frame type |
|---|---|---|
| TDLS discovery request frame | via AP | Data frame |
| TDLS discovery response frame | direct | Management frame |
| TDLS setup request frame | via AP | Data frame |
| TDLS setup response frame | via AP | Data frame |
| TDLS setup confirm frame | via AP | Data frame |
| TDLS teardown frame | both allowed | Data frame |
| TDLS channel switch request frame | direct | Data frame |
| TDLS channel switch response frame | direct | Data frame |
| TDLS peer power saving management request frame (TDLS Peer PSM Request frame) | Both allowed | Data frame |
| TDLS peer power saving management response frame (TDLS Peer PSM Response frame) | direct | Data frame |
| TDLS peer traffic indication frame | via AP | Data frame |
| TDLS peer traffic response frame | direct | Data frame |

The following describes AAD and an MPDU in the following embodiments described herein with reference to FIG. 5 and FIG. 6.

As shown in FIG. 5, the AAD includes one or more of the following fields: a frame control field, an address1 field, an address2 field, an address3 field, a sequence control field, an address4 field, and a quality of service control (QoS Control) field.

Specifically, the address11 indicates a receiver address (RA), the address2 indicates a transmitter address (TA), and the address3 indicates an address of an AP MLD associated with a receive end, or an address of an AP (an AP in the AP MLD) associated with the receive end. For a management frame, the address3 is used for frame filtering. For example, based on the address3, the frame belongs to a basic service set (BSS). In response to the frame not belonging to the basic service set, the frame is discarded.

A specific format of the AAD is not limited to that shown in FIG. 5. For example, the address4 in the AAD is optional. The specific format of the AAD is not limited in at least one embodiment.

Figure 6:
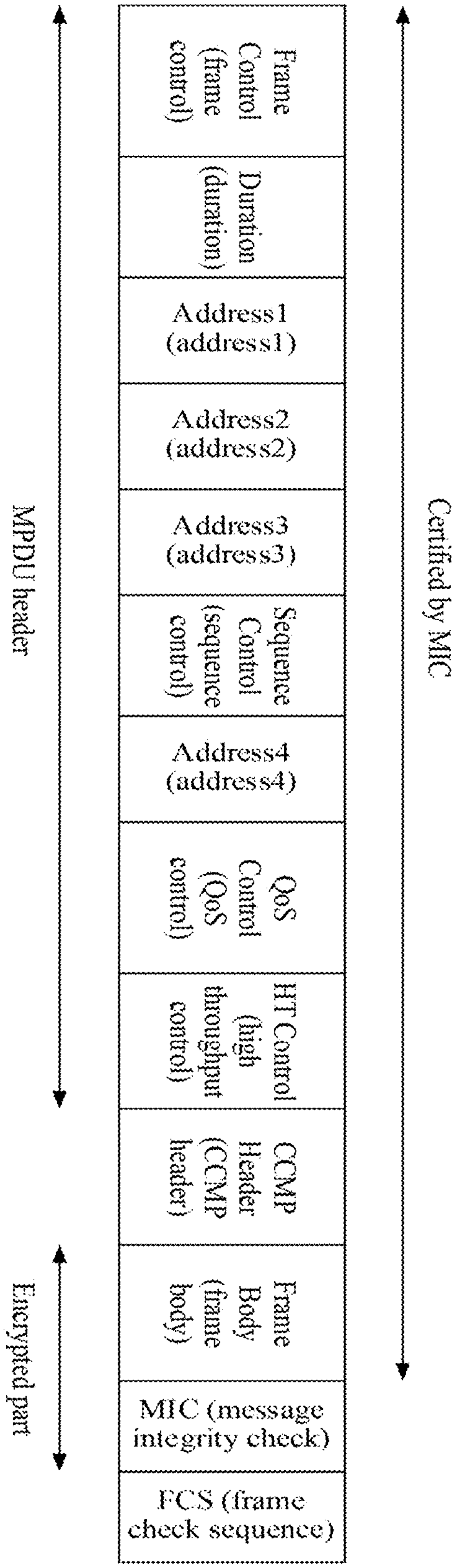
FIG. 6 is a schematic diagram of a frame structure of an MPDU according to at least one embodiment.

As shown in FIG. 6, the MPDU includes one or more of the following fields: a frame control field, a duration field, an address1 field, an address2 field, an address3 field, a sequence control field, an address4 field, a quality of service control field, a high throughput control (HT Control) field, a cipher block chaining message authentication code protocol header (CCMP Header) field, a frame body field, a message integrity code (MIC) field, and a frame check sequence (FCS) field.

Specifically, the address1 indicates a receiver address, the address2 indicates a transmitter address, and the address3 indicates an address of an AP MLD associated with a receive end, or an address of an AP (an AP in the AP MLD) associated with the receive end, or an address of an AP (an AP in the AP MLD) associated with a link between a transmit end and the receive end.

As shown in FIG. 6, an MPDU header includes: the frame control, the duration, the address1, the address2, the address3, the sequence control, the address4, the quality of service control, and the high throughput control. The transmit end calculates the MIC based on the AAD and the frame body of the MPDU, places the MIC behind the frame body, and then encrypts the frame body of the MPDU and the MIC for transmission. After receiving the MPDU, the receive end performs MIC check and calculates one piece of MIC. Then, the receive end compares the calculated MIC with the received MIC to check whether the MPDU has been tampered with.

A specific format of the MPDU is not limited to that shown in FIG. 6. For example, the address4 in the MPDU is optional. The specific format of the MPDU is not limited in at least one embodiment.

Address configurations of a data frame and a management frame transmitted between a legacy STA and an AP device are described below with reference to Table 2 and Table 3. The AP device includes an affiliated AP.

For the data frame and the management frame that are transmitted between the legacy STA and the AP device, an address1, an address2, an address3, and an address4 in an MPDU header are correspondingly consistent with an address1, an address2, an address3, and an address4 in AAD. Specific configurations are shown in Table 2 and Table 3.

For example, the address1, the address2, the address3, and the address4 in the MPDU header of the data frame, and the address1, the address2, the address3, and the address4 in the AAD are shown in Table 2. In Table 2, in response to distributed system (to distributed system, To DS)=0 and from distributed system (From DS)=0, point-to-point (P2P) being indicated, that is, a direct link, and communication being performed between STAs. In response to To DS=0 and From DS=1, downlink transmission being indicated, that is, a DS side sends information to a STA. In response to To DS=1 and From DS=0, uplink transmission is indicated, that is, the STA sends information to the DS side. A DA indicates a destination address (DA), an SA indicates a source address (SA), and a BSSID indicates an address of the affiliated AP of the AP device. Configurations of the address3 and the address4 are divided into two cases: a MAC service data unit and short aggregate MAC service data unit case (MSDU and Short A-MSDU case), and a basic A-MSDU and dynamic A-MSDU case.

TABLE 2

| | | | | Address3 | | Address4 | |
|---|---|---|---|---|---|---|---|
| To DS | From DS | Address 1 | Address2 | MSDU and Short A-MSDU case | Basic A-MSDU and Dynamic A-MSDU case | MSDU and Short A-MSDU case | Basic A-MSDU and Dynamic A-MSDU case |
| 0 | 0 | RA = DA | TA = SA | BSSID | BSSID | N/A | N/A |
| 0 | 1 | RA | TA = BSSID | SA | BSSID | N/A | N/A |
| 1 | 0 | RA = BSSID | TA | DA | BSSID | N/A | N/A |
| 1 | 1 | RA | TA | DA | BSSID | N/A | BSSID |

For example, the address1, the address2, and the address3 in the MPDU header of the management frame, and the address1, the address2, and the address3 in the AAD are shown in Table 3. A STA MAC address is an address of the legacy STA, and a BSSID indicates an address of the affiliated AP of the AP device.

TABLE 3

| Frame type | Direction | Address1 | Address2 | Address3 |
|---|---|---|---|---|
| Management frame | Uplink | BSSID | STA MAC Address | BSSID |
| | Downlink | STA MAC Address | BSSID | BSSID |

The following describes address configurations of a data frame and a management frame transmitted between a non-AP MLD and an AP MLD with reference to Table 4 and Table 5. The non-AP MLD includes a plurality of affiliated STAs, and the AP MLD includes a plurality of affiliated APs.

For example, for the data frame transmitted between the non-AP MLD and the AP MLD, specific configurations of an address1, an address2, and an address3 in AAD are shown in Table 4. For the data frame, the address1 and the address2 are set to corresponding device addresses in response to the AAD being constructed. In a case of an MSDU, for uplink data, an address3 is set as a destination address; and for downlink data, the address3 is set as a source address. In a case of an A-MSDU, an address 3 is set to an address of the AP MLD. In response to being transmitted over an air interface, an address1 and an address2 in an MPDU header are set to corresponding link addresses, and an address3 in the MPDU header is set to a same value as the address3 in the AAD.

TABLE 4

| Frame type | Direction | Address1 | Address2 | Address3 | |
|---|---|---|---|---|---|
| | | | | MSDU | A-MSDU |
| Data frame transmitted between MLDs | Uplink | AP MLD MAC Address | Non-AP MLD MAC Address | DA | AP MLD MAC Address |
| | Downlink | Non-AP MLD MAC Address | AP MLD MAC Address | SA | AP MLD MAC Address |

For example, for the management frame transmitted between the non-AP MLD and the AP MLD, specific configurations of an address1, an address2, and an address3 in AAD are shown in Table 5.

A case of a plurality of links, the management frame is classified into a link-level management frame and an MLD-level management frame. The link-level management frame means that the management frame is for a specific link, for example, a channel switch request/response frame. The MLD-level management frame is for an entire multi-link device, for example, an add block acknowledgment (ADDBA) frame.

TABLE 5

| Frame type | Direction | Address1 | Address2 | Address3 |
|---|---|---|---|---|
| MLD-level management frame | Uplink | AP MLD MAC Address | Non-AP MLD MAC Address | AP MLD MAC Address |
| | Downlink | Non-AP MLD MAC Address | AP MLD MAC Address | AP MLD MAC Address |
| Link-level management frame | Uplink | AP MLD MAC Address | Non-AP MLD MAC Address | Affiliated AP BSSID |
| | Downlink | Non-AP MLD MAC Address | AP MLD MAC Address | Affiliated AP BSSID |

Rules for configuring the address1, the address2, and the address3 in the AAD of the management frame and rules for configuring the address1, the address2, and the address3 in the MPDU header during transmission over the air interface are as follows: For the address1 and the address2, in response to the AAD being constructed, the address1 and the address2 are set to addresses of corresponding MLDs; and in response to being transmitted over the air interface, the address1 and the address2 in the MPDU header are replaced with corresponding link addresses. For the address3, in response to the management frame being a link-level management frame, A3 in the AAD is set to an affiliated AP address corresponding to a destination link. In response to being transmitted over the air interface, A3 in the MPDU header is the same as A3 in the AAD. For the MLD-level management frame, A3 in the AAD is set to an AP MLD address. In response to being transmitted over the air interface, A3 in the MPDU header is the same as A3 in the AAD.

The following specifically describes the direct link addressing method provided in embodiments described herein with reference to FIG. 7 to FIG. 17.

Figure 7:
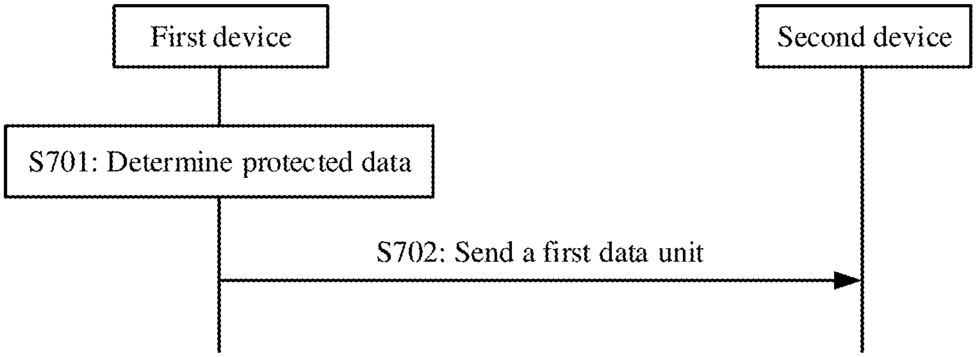
FIG. 7 is a schematic flowchart of a direct link addressing method according to at least one embodiment.

For example, FIG. 7 is a schematic flowchart of a direct link addressing method according to at least one embodiment. An example in which a first device is used as a TDLS initiator is used for description. The direct link addressing method is applicable to communication between the STA device and the non-AP MLD 2 that are shown in FIG. 1 or between the non-AP MLD 1 and the non-AP MLD 2 that are shown in FIG. 1.

As shown in FIG. 7, the direct link addressing method includes the following steps.

S701: The first device determines protected data.

For example, the first device includes one or more stations STAs, the first device is connected to a third device, and the third device includes a plurality of APs. In response to the first device including one STA, the first device is the STA device shown in FIG. 1. The STA device is referred to as a legacy STA. For ease of understanding, the legacy STA is used as an example for description in the following embodiments described herein. In response to the first device including a plurality of STAs, the first device is the non-AP MLD 1 shown in FIG. 1. The third device is the AP MLD shown in FIG. 1.

The protected data includes a first address, a second address, and a third address.

For example, the protected data is the AAD shown in FIG. 5, the first address is the address1 in the AAD, the second address is the address2 in the AAD, and the third address is the address3 in the AAD.

In some embodiments, in response to the first device including one STA, the first address is an address of a second device, the second address is an address of the first device, the third address is an address of a first AP of the third device, and the first device is connected to the first AP of the third device. The second device is connected to the third device, the second device includes a plurality of STAs, and the second device is the non-AP MLD 2 shown in FIG. 1.

Figure 8:
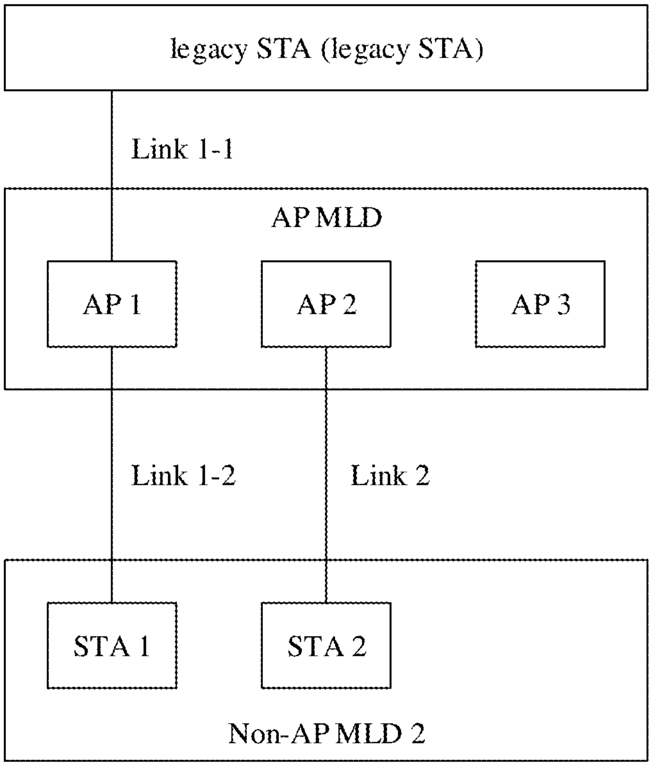
FIG. 8 is a schematic diagram of a structure of an AP MLD, a legacy STA, and a non-AP MLD 2 that participate in communication according to at least one embodiment.

For example, FIG. 8 shows an example in which the first device is the legacy STA, the second device is the non-AP MLD 2, and the third device is the AP MLD. As shown in FIG. 8, the AP MLD includes an AP 1, an AP 2, and an AP 3. The legacy STA is connected to the AP 1 of the AP MLD, and a STA 1 and a STA 2 of the non-AP MLD 2 are respectively connected to the AP 1 and the AP 2 of the AP MLD. As shown in Table 6, the first address is an address of the non-AP MLD 2, for example, a non-AP MLD 2 MAC address; the second address is an address of the legacy STA, for example, a legacy STA MAC address; and the third address is an address of the AP 1, for example, a BSSID of the AP 1.

TABLE 6

| | Protected data | | |
|---|---|---|---|
| Scenario | First address | Second address | Third address |
| (legacy STA, non-AP MLD 2) | non-AP MLD 2 MAC Address | legacy STA MAC Address | BSSID of the AP 1 |

In some embodiments, in response to the first device including a plurality of STAs, the first address is an address of the second device, the second address is an address of the first device, and the third address is an address of the third device.

TABLE 7

| | Protected data | | |
|---|---|---|---|
| Scenario | First address | Second address | Third address |
| (non-AP MLD 1, non-AP MLD 2) | non-AP MLD 2 MAC Address | non-AP MLD 1 MAC Address | AP MLD MAC Address |

Figure 9:
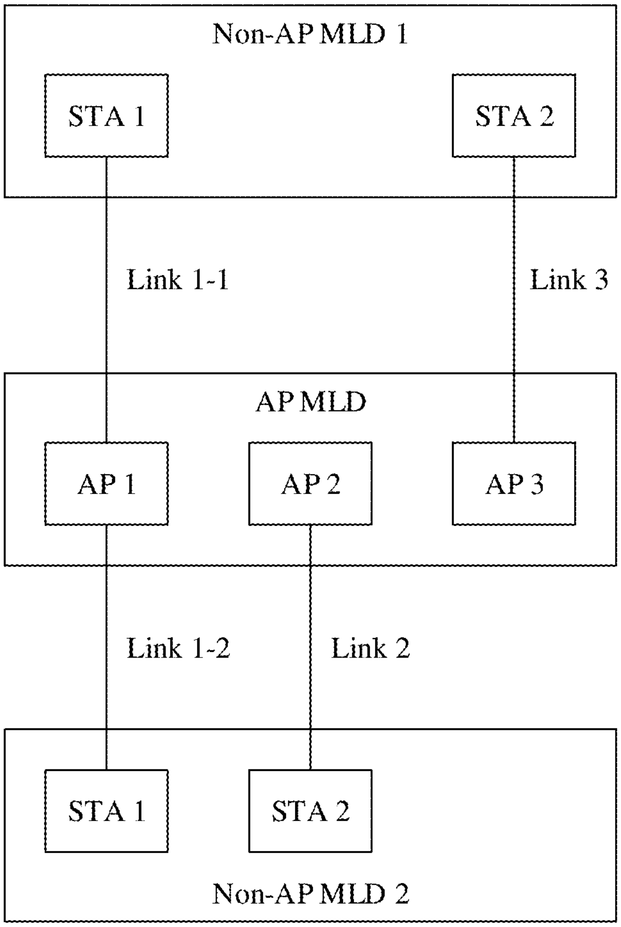
FIG. 9 is a schematic diagram of a structure of an AP MLD, a non-AP MLD 1, and a non-AP MLD 2 that participate in communication according to at least one embodiment.

For example, FIG. 9 shows an example in which the first device is the non-AP MLD 1, the second device is the non-AP MLD 2, and the third device is the AP MLD. As shown in FIG. 9, the AP MLD includes an AP 1, an AP 2, and an AP 3, a STA 1 and a STA 2 of the non-AP MLD 1 are respectively connected to the AP 1 and the AP 3 of the AP MLD, and a STA 1 and a STA 2 of the non-AP MLD 2 are respectively connected to the AP 1 and the AP 2 of the AP MLD. As shown in Table 7, the first address is an address of the non-AP MLD 2, for example, the non-AP MLD 2 MAC address; the second address is an address of the non-AP MLD 1, for example, the non-AP MLD 1 MAC address; and the third address is an address of the AP MLD, for example, the AP MLD MAC address.

FIG. 8 and FIG. 9 are merely examples provided in at least one embodiment. A quantity of STAs included in the non-AP MLD 2 and a quantity of APs included in the AP MLD are not limited, and how the non-AP MLD 2 is connected to the AP MLD and how the legacy STA is connected to the AP MLD are not limited.

S702: The first device sends a first data unit. Correspondingly, the second device receives the first data unit from the first device.

The first data unit includes a first header, the first header is determined based on the protected data, and the first data unit is transmitted over a direct link between the first device and the second device.

For example, the first data unit is the MPDU shown in FIG. 6, and the first header is the MPDU header shown in FIG. 6.

With reference to FIG. 9, the first data unit is transmitted over a link 1 between the first device and the second device, and is not to be forwarded by the second device, thereby reducing a transmission delay.

Optionally, before or in a process in which the first device sends the first data unit in S702, the first data unit is determined. Specifically, one or more of the following Manner 1 to Manner 4 are used.

Manner 1: The First Device Determines the First Header of the First Data Unit.

Optionally, the first header includes a fourth address, a fifth address, and a sixth address.

For example, the first header is the MPDU header shown in FIG. 6. The fourth address is the address1 in the MPDU header, the fifth address is the address2 in the MPDU header, and the sixth address is the address3 in the MPDU header.

In some embodiments, in response to the first device including one STA, the fourth address is an address of the second device, the fifth address is an address of the first device, and the sixth address is an address of the first AP of the third device.

For example, FIG. 8 shows an example in which the first device is the legacy STA, the second device is the non-AP MLD 2, and the third device is the AP MLD. As shown in FIG. 8, the AP MLD includes an AP 1, an AP 2, and an AP 3, the legacy STA is connected to the AP 1 of the AP MLD, and a STA 1 and a STA 2 of the non-AP MLD 2 are respectively connected to the AP 1 and the AP 2 of the AP MLD. In response to the first device sending the first data unit to the second device, address configurations in the first data unit are shown in Table 8. The fourth address is an address of the non-AP MLD 2, for example, a non-AP MLD 2 MAC address. The fifth address is an address of the legacy STA, for example, a legacy STA MAC address. The sixth address is an address of the AP 1, for example, a BSSID of the AP 1.

The fourth address, the fifth address, and the sixth address in the first header is respectively the same as the first address, the second address, and the third address in the protected data.

TABLE 8

| | First header | | |
|---|---|---|---|
| Scenario | Fourth address | Fifth address | Sixth address |
| (legacy STA, non-AP MLD 2) | non-AP MLD 2 MAC Address | legacy STA MAC Address | BSSID of the AP 1 |

In some embodiments, in response to the first device including a plurality of STAs, the fourth address is an address of a STA that corresponds to a first direct link and that is in the plurality of STAs of the second device, the fifth address is an address of a STA that corresponds to the first direct link and that is in the plurality of STAs of the first device, the sixth address is an address of an AP that corresponds to the first direct link and that is in the plurality of APs of the third device, and the first direct link is a direct link between the first device and the second device.

Figures 10, 11:
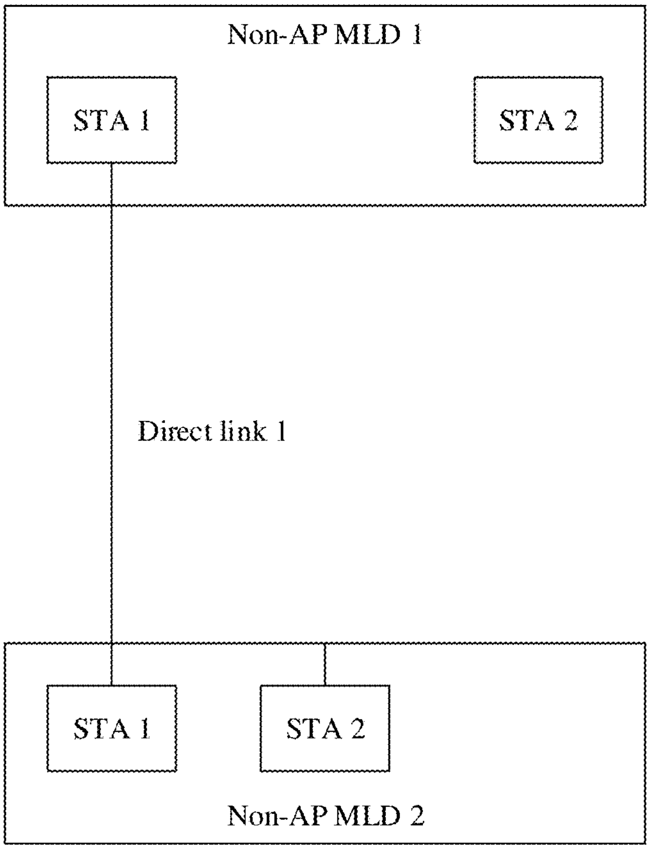
FIG. 10 is a schematic diagram of a structure of a non-AP MLD 1 and a non-AP MLD 2 that participate in communication according to at least one embodiment.
FIG. 11 is a schematic diagram of a frame structure of a wakeup schedule element according to at least one embodiment.

For example, FIG. 9 and FIG. 10 show an example in which the first device is the non-AP MLD 1, the second device is the non-AP MLD 2, and the third device is the AP MLD. As shown in FIG. 9, a link 1-1 and a link 3 are set up between the first device and the third device, and a link 1-2 and a link 2 are set up between the second device and the third device. As shown in FIG. 10, a STA 1 of the non-AP MLD 1 is connected to a STA 1 of the non-AP MLD 2, and corresponds to a direct link 1. In response to the first device sending the first data unit to the second device, address configurations in the first data unit are shown in Table 9. The fourth address is an address of the STA 1 of the non-AP MLD 2, for example, an affiliated STA 1 MAC address of the non-AP MLD 2. The fifth address is an address of the STA 1 of the non-AP MLD 1, for example, an affiliated STA 1 MAC address of the non-AP MLD 1. The sixth address is an address of an AP 1 corresponding to the link 1, for example, an affiliated AP 1 BSSID of the AP MLD or an affiliated AP 1 AP MLD MAC address.

In response to a plurality of direct links existing between the first device and the second device, the first direct link is a direct link for transmitting the first data unit in the direct links between the first device and the second device.

TABLE 9

| | First header | | |
|---|---|---|---|
| Scenario | Fourth address | Fifth address | Sixth address |
| (non-AP MLD 1, non-AP MLD 2) | affiliated STA 1 MAC address of the non-AP MLD 2 | affiliated STA 1 MAC address of the non-AP MLD 1 | Affiliated AP 1 BSSID of the AP MLD |

Manner 2: The First Device Determines a First Element of the First Data Unit.

Specifically, the first data unit includes a TDLS frame, and the TDLS frame includes the first element. The first element indicates an identifier (ID) of a target link or an address of an AP that corresponds to the target link and that is in the plurality of APs of the third device. For example, the first element is set to a BSSID corresponding to the target link.

Optionally, the TDLS frame is a TDLS channel switch request frame or a TDLS channel switch response frame.

The third device includes an AP 1, an AP 2, and an AP 3, and the AP 2 corresponds to the target link. In this case, the address of the AP that corresponds to the target link and that is in the plurality of APs of the third device is an address of the AP 2 of the third device, that is, an affiliated AP 2 BSSID of the AP MLD.

Optionally, the target link is a second direct link to which the TDLS frame is applied, and the second direct link is a direct link between the first device and the second device.

A direct link 1 and a direct link 2 exist between the first device and the second device, the TDLS frame is a TDLS channel switch request frame or a TDLS channel switch response frame, and a target link corresponding to the TDLS channel switch request/response frame is the direct link 2, the direct link 2 is switched from a current channel to a specified channel based on a first element corresponding to the TDLS channel switch request/response frame.

In a multi-link TDLS scenario, the first element indicates the target link, and the TDLS channel switch request/response frame is transmitted over any direct link, instead of necessarily being transmitted over the target link to which the TDLS channel switch request/response frame is to be switched, thereby improving transmission flexibility.

Optionally, the first element is the link identifier element shown in FIG. 4, or a newly defined element. In some embodiments, a first field in the first element indicates the identifier of the target link or the address of the AP that corresponds to the target link and that is in the plurality of APs of the third device. For example, the first field is a BSSID field of the link identifier element.

Manner 3: The First Device Determines a Second Element of the First Data Unit.

Specifically, the first data unit includes a TDLS frame, and the TDLS frame includes a wakeup schedule element and the second element. An offset field in the wakeup schedule element is an offset relative to a first timing synchronization function threshold of a third direct link, the second element indicates an identifier of the third direct link or an address of an AP that corresponds to the third direct link and that is in the plurality of APs of the third device, and the third direct link is a direct link between the first device and the second device.

A direct link 1 and a direct link 2 exist between the first device and the second device, the third device includes an AP 1, an AP 2, and an AP 3, the direct link 1 corresponds to the AP 1, the direct link 2 corresponds to the AP 2, and the offset field in the wakeup schedule element is an offset relative to a first timing synchronization function threshold of the direct link 2. In this case, the second element indicates an identifier of the direct link 2 or an address of the AP 2 of the third device, for example, an affiliated AP 2 BSSID of the AP MLD.

Different affiliated APs of the AP MLD have independent timing synchronization functions (TSF). In this way, a determination is made that the offset field in the wakeup schedule element is relative to a TSF of a specific direct link by using an identifier or an address indicated by the second element.

Optionally, the TDLS frame is a TDLS peer power saving management request frame or a TDLS peer power saving management response frame.

In this way, after a TDLS initiator and a TDLS responder exchange a TDLS peer power saving management request frame and a TDLS peer power saving management response frame, the TDLS initiator and the TDLS responder periodically wakes up and receives/sends data based on a wakeup schedule element carried in the TDLS peer power saving management request frame and/or the TDLS peer power saving management response frame, thereby reducing power consumption. In addition, the third direct link relative to the offset field is indicated, so that in the multi-link TDLS scenario, the TDLS peer PSM request/response frame is transmitted over any direct link, and an end correctly parses the wakeup schedule element, thereby improving transmission flexibility.

Optionally, the second element is the link identifier element shown in FIG. 4, or a newly defined element. In some embodiments, a first field in the second element indicates the identifier of the third direct link or the address of the AP that corresponds to the third direct link and that is in the plurality of APs of the third device. For example, the first field is a BSSID field of the link identifier element.

Optionally, the wakeup schedule element reuses an existing wakeup schedule element, or is a newly defined element.

For example, with reference to FIG. 11, the wakeup schedule element includes one or more of the following fields: an element ID field, a length field, an offset field, an interval field, an awake window slots (Awake window Slots) field, a maximum awake window duration field, and an idle count field.

The offset field indicates an offset of a first awake window relative to a TSF 0. The TSF is a counter, and a value stored in the counter represents a time value. The interval field indicates a time interval between two adjacent awake windows. The awake window slot field indicates duration of an awake window. The maximum awake window duration field indicates maximum duration of an awake window. The idle count field indicates a quantity of idle awake windows that are allowed to go through before a TDLS peer end deletes periodic wakeup schedule. The idle awake window means that no unicast frame is received from the TDLS peer end in the awake window. For example, in response to the first device not receiving a unicast frame from the second device in a process in which the first device goes through the quantity of awake windows indicated by the idle count field, the second device deletes the wakeup schedule element.

Manner 2 and Manner 3 is used independently or in combination. In response to being used in combination, the first element and the second element is a same element, for example, the first element, so that the first element indicates the identifier of the target link or the address of the AP that corresponds to the target link and that is in the plurality of APs of the third device, and indicates the identifier of the third direct link or the address of the AP that corresponds to the third direct link and that is in the plurality of APs of the third device. In other words, the target link and the third direct link are a same direct link.

For different TDLS frames, the following describes a configuration manner of the foregoing link identifier element or a newly defined element with reference to Table 10. In other words, in response to TDLS frames being different frames, the link identifier element, the newly defined element, the BSSID field in the link identifier element, or a first field of the newly defined element corresponds to different configured content. For ease of description, the link identifier element, the newly defined element, the first element, and the second element are collectively referred to as the first element below.

In some scenarios, in response to the first device including one STA, and the TDLS frame being a TDLS discovery request frame, the first element indicates an identifier of a transmission link or an address of an AP that corresponds to the transmission link and that is in the plurality of APs of the third device. The transmission link is a link for sending the TDLS discovery request frame. For example, the first element is set to a BSSID corresponding to the transmission link.

In response to the first device including one STA, and the TDLS frame being a TDLS discovery response frame, the first element indicates an identifier of a transmission link or an address of an AP that corresponds to the transmission link and that is in the plurality of APs of the third device. The transmission link is a link for sending the TDLS discovery request frame.

TABLE 10

| | | | | First element | |
|---|---|---|---|---|---|
| TDLS frame | Transmission mode | Frame type | Note | legacy STA and the non-AP MLD 2 | non-AP MLD 1 and the non-AP MLD 2 |
| TDLS discovery request frame | Via AP | Data frame | MLD-level | Set to the BSSID corresponding to the transmission link | Set to a BSSID corresponding to a reference link |
| TDLS discovery response frame | Direct | Management frame | Allow unsolicited sending MLD-level | Set to a BSSID corresponding to the transmission link for sending the TDLS discovery request frame | Set to a BSSID corresponding to a common link for transmitting the TDLS discovery response frame (the TDLS discovery response frame is transmitted over any common link) |
| TDLS setup request frame | Via AP | Data frame | MLD-level | Set to a BSSID of a link on which the legacy STA is located | Set to a BSSID corresponding to a reference link, and a BSSID in the TDLS setup request/response/confirm frame remains unchanged |
| TDLS setup response frame | Via AP | Data frame | MLD-level | Set to a BSSID of a link on which the legacy STA is located | |
| TDLS setup confirm frame | Via AP | Data frame | MLD-level | Set to a BSSID of a link on which the legacy STA is located | |
| TDLS teardown frame | Both allowed | Data frame | MLD-level; and if a direct link is unreachable, forwarding is performed by an AP | Set to a BSSID of a link on which the legacy STA is located | Set to an AP MLD MAC address |
| TDLS channel switch request frame | Direct | Data frame | Link-level | Set to a BSSID of a link on which the legacy STA is located | Set to the BSSID corresponding to the target link |
| TDLS channel switch response frame | Direct | Data frame | Link-level | Set to a BSSID of a link on which the legacy STA is located | Set to the BSSID corresponding to the target link |
| TDLS peer power saving management request frame | Both allowed | Data frame | MLD-level | Set to a BSSID of a link on which the legacy STA is located | Set to a BSSID of the third direct link corresponding to the wakeup schedule element |

TABLE 10-continued

| TDLS frame | Transmission mode | Frame type | Note | First element: legacy STA and the non-AP MLD 2 | First element: non-AP MLD 1 and the non-AP MLD 2 |
|---|---|---|---|---|---|
| TDLS peer power saving management response frame | Direct | Data frame | MLD-level | Set to a BSSID of a link on which the legacy STA is located | Set to a BSSID of the third direct link corresponding to the wakeup schedule element |
| TDLS peer traffic indication frame | Via AP | Data frame | MLD-level | Set to a BSSID of a link on which the legacy STA is located | Set to the address of the third device, for example, an AP MLD MAC address |
| TDLS peer traffic response frame | Direct | Data frame | MLD-level | Set to a BSSID of a link on which the legacy STA is located | Set to the address of the third device, for example, an AP MLD MAC address |

In other words, configured content of the first element corresponding to the TDLS frame that is a TDLS discovery response frame is the same as configured content of the first element corresponding to the TDLS frame that is a TDLS discovery request frame. For example, the first element is set to the BSSID corresponding to the transmission link for sending the TDLS discovery request frame.

In response to the first device including one STA, and the TDLS frame being a TDLS setup request frame, the first element indicates an identifier of a link between the first device and the third device, or an address of an AP that corresponds to the first device and that is in the plurality of APs of the third device. The transmission link is a link for sending the TDLS discovery request frame. For example, the first element is set to the BSSID corresponding to the link on which the legacy STA is located.

In response to the first device including one STA, and the TDLS frame being a TDLS setup response frame, a TDLS setup confirm frame, a TDLS teardown frame, a TDLS channel switch request frame, a TDLS channel switch response frame, a TDLS peer power saving management request frame, a TDLS peer power saving management response frame, a TDLS peer traffic indication frame, or a TDLS peer traffic response frame, for a specific implementation of the first element, refer to the foregoing implementation of the first element in response to the first device including one STA and the TDLS frame being a TDLS setup request frame. Details are not described herein again.

In some other scenarios, in response to the first device including a plurality of STAs, and the TDLS frame being a TDLS discovery request frame, the first element indicates the identifier of the reference link or an address of an AP that corresponds to the reference link and that is in the plurality of APs of the third device. Optionally, the reference link is a link indicated by the BSSID field in the link identifier element. For example, the first element is set to the BSSID corresponding to the reference link.

In response to the first device including a plurality of STAs, and the TDLS frame being a TDLS discovery response frame, the first element indicates an identifier of the common link for transmitting the TDLS discovery response frame, or an address of an AP that corresponds to the common link for transmitting the TDLS discovery response frame and that is in the plurality of APs of the third device. The common link is a common link of a link between the first device and the third device and a link between the second device and the third device, and an AP of the third device associated with a STA of the first device corresponding to the common link is the same as an AP of the third device associated with a STA of the second device corresponding to the common link.

Optionally, in response to the first device including a plurality of STAs, the TDLS discovery response frame is transmitted over any common link.

In response to the first device including a plurality of STAs, and the TDLS frame being a TDLS setup request frame, a TDLS setup response frame, or a TDLS setup confirm frame, the first element indicates the identifier of the reference link, or the address of the AP that corresponds to the reference link and that is in the plurality of APs of the third device. For example, the first element is set to the BSSID corresponding to the reference link.

In response to the first device including a plurality of STAs, and the TDLS frame being a TDLS teardown frame, the first element indicates an address of the third device, and direct links are torn down between the first device and the second device. For example, the first element is set to the AP MLD MAC address. Alternatively, the first element indicates an address of an AP that corresponds to the direct link between the first device and the second device and that is in the plurality of APs of the third device, for example, a BSSID corresponding to a direct link. For example, in response to the first element being set to an address of an affiliated AP corresponding to a direct link between the first device and the second device, the direct link is torn down, that is, data cannot be subsequently received or sent over the direct link.

In response to the first device including a plurality of STAs, and the TDLS frame being a TDLS channel switch request frame or a TDLS channel switch response frame, for a specific implementation of the first element, refer to the foregoing Manner 2. Details are not described herein again. For example, the first element is set to the BSSID corresponding to the target link.

In response to the first device including a plurality of STAs, and the TDLS frame being a TDLS peer power saving management request frame or a TDLS peer power saving management response frame, for a specific implementation of the first element, refer to the foregoing Manner 3. Details are not described herein again. For example, the first element is set to the BSSID of the third direct link corresponding to the wakeup schedule element.

In response to the first device including a plurality of STAs, and the TDLS frame being a TDLS peer traffic indication frame or a TDLS peer traffic response frame, the first element indicates the address of the third device. For example, the first element is set to the AP MLD MAC address.

The following describes the reference link, the transmission link, and the common link in detail.

Reference link: In response to the frame body of the MPDU carrying the multi-link element, a link indicated by the BSSID field in the link identifier element is referred to as a reference link. For example, for the specific format of the MPDU, refer to FIG. 6. For the specific format of the multi-link element, refer to FIG. 3 or FIG. 12. For a specific format of the link identifier element, refer to FIG. 4.

Specifically, for setup of multi-link TDLS, in response to the first device including a plurality of STAs, a multi-link element is to be carried in the following TDLS action frames: a TDLS setup request/response frame or a TDLS discovery request/response frame. After a TDLS initiator and a TDLS responder successfully exchange a TDLS discovery request/response frame, a non-AP MLD knows whether a peer end is an MLD. In response to both the TDLS initiator and the TDLS responder being MLDs, a multi-link element is carried in a subsequent TDLS setup request/response frame.

Figure 12:
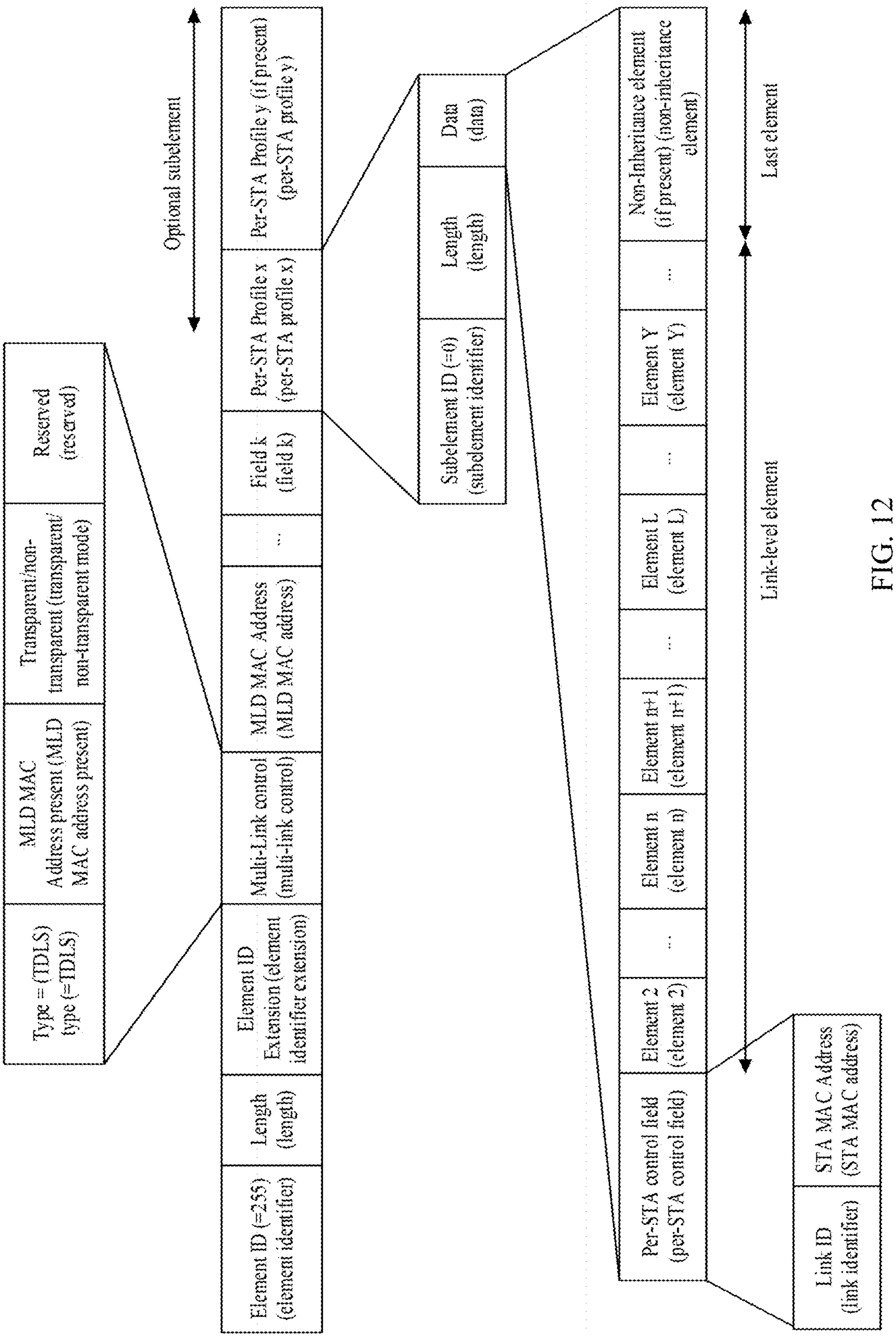
FIG. 12 is a schematic diagram of a frame structure of another multi-link element according to at least one embodiment.

FIG. 12 is a schematic diagram of a frame structure of another multi-link element according to at least one embodiment. As shown in FIG. 12, a type subfield is set to a number corresponding to TDLS. A transparent/non-transparent transmission bit indicates an address mode used by the non-AP MLD. In response to the address mode being transparent, a link address of the non-AP MLD is the same as a non-AP MLD address. In response to the address mode being non-transparent, different links corresponding to the non-AP MLD use different link addresses, and the non-AP MLD address is different from the link addresses of the non-AP MLD. In this case, a corresponding link ID and an address used by an affiliated STA, that is, a link address, is to be indicated at the beginning of each per-STA profile. An MLD MAC address field is always set to the AP MLD MAC address.

For a specific format of the frame body, refer to FIG. 13. The frame body includes information about a reference link (such as an element ID #1 and an element ID #2) and information about another link (multi-link element). For example, with reference to FIG. 3 or FIG. 12, the information about the another link is carried in a per-STA profile in the multi-link element.

Transmission link: indicates a link on which a frame is sent. The corresponding link is referred to as a transmission link. A TDLS frame is sent over a link 1, the link 1 is referred to as a transmission link.

For a TDLS frame (for example, a TDLS discovery response) encapsulated into a management frame and directly transmitted, a transmission link is a reference link. Specifically, in response to the management frame being sent, the transmission link is to be consistent with the reference link. For example, in response to an initiator sending a multi-link association request frame over a link 1, a responder also returns a multi-link association response frame over the link 1.

For a TDLS frame encapsulated into a data frame, a transmission link is different from a reference link. Specifically, in response to the data frame being sent, the transmission link is any link, in other words, the data frame is sent over any link. Therefore, the transmission link is the same as or different from the reference link.

For example, a manner of sending the data frame includes: One possibility is that the data frame is sent according to the management frame being sent, to be specific, the data frame is sent back over a link that is sent. In addition, the transmission link is consistent with the reference link. The other possibility is that the data frame is sent according to the data frame being sent, to be specific, the data frame is transmitted over any link. For example, a TDLS setup request frame is sent over a link 1, and a TDLS setup response frame is sent over a link 2. In this case, the transmission link is able to not be consistent with the reference link.

Common link: A direct link corresponding to two STAs (the STA refers to a legacy STA or an affiliated STA of a non-AP MLD) associated with a same affiliated AP is referred to as a common link. For a (legacy STA, MLD) scenario, a link associated with the legacy STA is a common link. For a (non-AP MLD 1, non-AP MLD 2) scenario, a plurality of common links exist.

For example, the AP MLD corresponds to a link 1, a link 2, and a link 3, the link 1 and the link 2 are set up between the non-AP MLD 1 and the AP MLD, and the link 1 and the link 3 are set up between the non-AP MLD 2 and the AP MLD. Both a STA 1 of the non-AP MLD 1 and a STA 1 of the non-AP MLD 2 are associated with an AP 1 of the AP MLD, and correspond to the link 1. A STA 2 of the non-AP MLD 1 is associated with an AP 2 of the AP MLD and corresponds to the link 2. A STA 3 of the non-AP MLD 2 is associated with an AP 3 of the AP MLD, and corresponds to the link 3. A direct link 1 and a direct link 2 are set up, the STA 1 of the non-AP MLD 1 and the STA 1 of the non-AP MLD 2 correspond to the direct link 1, and the STA 2 of the non-AP MLD 1 and the STA 3 of the non-AP MLD 2 correspond to the direct link 2. In this case, the direct link 1 is referred to as a common link.

Manner 4: The First Device Determines a Third Element of the First Data Unit.

Optionally, the first data unit includes the third element, and the third element indicates to set up at least one fourth direct link on a first link. The first link is a common link of the link between the first device and the third device and the link between the second device and the third device, and the first link includes the at least one fourth direct link.

In other words, the first link is a common link between the first device and the third device and between the second device and the third device, and an AP of the third device associated with a STA of the first device corresponding to the first link is the same as an AP of the third device associated with a STA of the second device corresponding to the first link. In this way, the first device and the second device set up a direct link on the common link, to increase a data transmission rate.

In some embodiments, the third element includes a number of direct links field and a direct link identifier field. The number of direct links field indicates a quantity of fourth direct links requested to be set up. In this way, the quantity of fourth direct links to be set up is indicated, so that the fourth direct link is set up on some or all links of the first link, thereby improving flexibility of setting up a direct link.

Specifically, the direct link identifier field includes an address of at least one AP that separately corresponds to the at least one fourth direct link and that is in the plurality of APs of the third device, or an identifier of the at least one fourth direct link. In other words, the direct link identifier field includes a BSSID of the at least one AP that separately corresponds to the at least one fourth direct link and that is in the plurality of APs of the third device, or a link ID of the at least one fourth direct link. In this way, links on which direct links are set up is indicated.

In embodiments described herein, the "MAC address of the AP", the "BSSID of the AP", and the "address of the AP" express a same meaning in response to a difference between the "MAC address of the AP", the "BSSID of the AP", and the "address of the AP" not being emphasized.

Alternatively, optionally, the direct link identifier field includes an address of a first STA of the first device and an address of a second STA of the second device. In other words, the direct link identifier field includes addresses of affiliated STAs at two ends of the direct link, for example, a MAC address of the first STA or a MAC address of the second STA.

Alternatively, optionally, the direct link identifier field includes the address of the at least one AP that separately corresponds to the at least one fourth direct link and that is in the plurality of APs of the third device or the identifier of the at least one fourth direct link, the address of the first STA of the first device, and the address of the second STA of the second device.

The foregoing third element in Manner 4 is described by using a scenario in which a direct link is set up on the common link. In at least one embodiment, a direct link is set up on a non-common link between the first device and the second device. In response to the direct link being set up on the non-common link, an implementation of the third element is similar to a specific implementation of the third element corresponding to a scenario in which a direct link is set up on the common link.

For example, the third element indicates to set up at least one fifth direct link on a second link. The second link is a link different from the link between the first device and the third device and the link between the second device and the third device, and the second link includes the at least one fifth direct link.

In other words, the second link is a non-common link between the first device and the third device and between the second device and the third device, and an AP of the third device associated with a STA of the first device corresponding to the second link is different from an AP of the third device associated with a STA of the second device corresponding to the second link. In this way, the first device and the second device set up a direct link on the non-common link, to increase a data transmission rate.

In some embodiments, the third element includes a number of direct links field and a direct link identifier field. The number of direct links field indicates a quantity of fifth direct links requested to be set up. In this way, the quantity of fifth direct links to be set up is indicated, so that the fifth direct link is set up on some or all links of the second link, thereby improving flexibility of setting up a direct link.

Specifically, the direct link identifier field includes an address of at least one AP that separately corresponds to the at least one fifth direct link and that is in the plurality of APs of the third device, or an identifier of the at least one fifth direct link. For example, one end of the fifth direct link corresponds to a STA of the first device, and the other end of the fifth direct link corresponds to a STA of the second device. The direct link identifier field includes an address of an AP that corresponds to the STA of the first device and that is in the plurality of APs of the third device, or an address of an AP that corresponds to the STA of the second device and that is in the plurality of APs of the third device.

In other words, the direct link identifier field includes a BSSID of an affiliated AP corresponding to either end of two ends of the fifth direct link or an identifier of the second link corresponding to the affiliated AP.

Alternatively, an indirect link is represented by using an address of an affiliated AP corresponding to an initiator setting up the direct link or an identifier of the second link corresponding to the affiliated AP. For example, in response to direct link setup being initiated by the first device, the direct link identifier field includes the address of the AP that corresponds to the STA of the first device and that is in the plurality of APs of the third device, or the identifier of the second link corresponding to the affiliated AP.

In some embodiments, the third element is a TDLS link information element. As shown in FIG. 14, the TDLS link information element includes one or more of the following fields: an element ID field, a length field, a number of direct links (Number of Direct links) field, and a direct link identifier field.

A format of the third element is not limited in at least one embodiment, and FIG. 14 is merely an example of at least one embodiment.

The foregoing Manner 1 to Manner 4 is used in combination with the direct link addressing method shown in FIG. 7, or the foregoing Manner 1 to Manner 4 is used independently or in combination with each other. This is not limited in at least one embodiment.

In some embodiments, a seventh address is bound to a TPK.

Optionally, the seventh address includes an address of an AP that corresponds to the direct link between the first device and the second device and that is in the plurality of APs of the third device or addresses of all the APs of the third device, and the address of the third device.

In other words, an address of an affiliated AP (for example, a BSSID of the affiliated AP) corresponding to the direct link and the address of the third device is bound to the TPK, or addresses of all affiliated APs (for example, BSSIDs of all the affiliated APs) of the third device and the address of the third device is bound to the TPK.

Optionally, in response to the first device including a plurality of STAs, the first device and the second device negotiates to set up a direct link on some or all links, to bind an address of an affiliated AP corresponding to the set up direct link and the address of the third device to the TPK, or bind the addresses of all the affiliated APs of the third device and the address of the third device to the TPK. In this way, security of communication between the first device and the second device over the direct link is improved.

The direct link addressing method provided in at least one embodiment further includes a TPK derivation process shown in the following step 1 and step 2. The step 1 and the step 2 is used independently, or used in combination with the method, Manner 1, Manner 2, Manner 3, and/or Manner 4 shown in FIG. 7.

Step 1: The first device negotiates with the second device to determine an authentication and key management (AKM) suite selector.

For example, as shown in Table 11, the AKM suite selector includes one or more of the following: an organizationally unique identifier (OUI), a suite type, authentication, key management, key derivation, and an authentication number. For specific corresponding content of each item, refer to Table 11. Details are not described herein.

TABLE 11

| OUI | Suite type | Authentication | Key management | Key derivation | Authentication number |
|---|---|---|---|---|---|
| 00-0F-AC | 23 | Multi-link TDLS (ML-MLD-TDLS) | Multi-link TPK handshake between MLDs peers (ML-TPK handshake between MLD peers) | Defined in 12.7.1.6.2 (Defined in 12.7.1.6.2) | Not applicable (N/A) |

Step b: The second device sends a TDLS setup response frame to the first device. Correspondingly, the first device receives the TDLS setup response frame from the second device.

Step 2: The first device negotiates with the second device to derive the TDLS peer key TPK.

Optionally, the TPK is determined by using the following Formula (1) and Formula (2):

$$\text{TPK-Key-Input}=\text{Hash}(\min(\text{SNonce},\text{ANonce})\|\max(\text{SNonce},\text{ANonce})) \quad (1),$$

where in the foregoing Formula (1), Hash represents a hash algorithm, SNonce (supplicant nonce) represents a requester random number, ANonce (authenticator nonce) represents an authenticator random number, II represents concatenation or inclusion, a mathematical symbol min represents taking a minimum value, and a mathematical symbol max represents taking a maximum value; and $$\text{TPK}=\text{KDF-Hash-Length}(\text{TPK-Key-Input},\text{“TDLS MLD PMK”},\min(\text{MAC\_I},\text{MAC\_R})\|\max(\text{MAC\_I},\text{MAC\_R})\|\text{AP MLD MAC Address}\|\text{Affiliated AP Address1}\|\ldots\text{Affiliated AP Addressn}) \quad (2),$$

where in the foregoing Formula (2), TPK represents the TDLS peer key, KDF-Hash-Length represents a key derivation function, "TDLS MLD PMK" represents a TDLS MLD pairwise master key (PMK), II represents concatenation or inclusion, a mathematical symbol min represents taking a minimum value, a mathematical symbol max represents taking a maximum value, the AP MLD MAC Address represents the address of the third device (AP MLD), and the affiliated AP Address1 represents an address of an affiliated AP (an AP of the third device) corresponding to the direct link between the first device and the second device. In response to the first device being an initiator, MAC_I represents a MAC address of the first device, and MAC_R represents a MAC address of the second device.

The foregoing step 1 and step 2 are also applied to derivation of the pairwise master key (PTK), and the seventh address is bound to the PTK. Details are not described herein again.

In some embodiments, the first device and the second device complete TPK derivation handshake negotiation by exchanging a TDLS setup request/response/confirm frame (for details, refer to the following step a to step c). To be specific, the foregoing step 1 and step 2 is used in combination with the following step a to step c to complete TPK derivation handshake negotiation.

An example in which the first device is used as a TDLS initiator is used.

Step a: The first device sends a TDLS setup request frame to the second device. Correspondingly, the second device receives the TDLS setup request frame from the first device.

Optionally, the second device sends the TDLS setup response frame to the first device based on a link identifier element and/or a TDLS link info element.

For example, the TDLS setup response frame includes accepting a TDLS setup request or not accepting a TDLS setup request. For example, a status code of the TDLS setup response frame indicates accept or not accept.

Step c: In response to the TDLS setup response frame indicating accept, the first device sends a TDLS setup confirm frame to the second device, to complete TPK derivation handshake negotiation.

According to the direct link addressing method described in FIG. 7, in response to the first device including one STA, the protected data is constructed by using the address of the first device, the address of the second device, and the address of the first AP connected to the first device. In response to the first device including a plurality of STAs, the protected data is constructed by using the address of the first device, the address of the second device, and the address of the third device. Therefore, the first device transmits the first data unit over the direct link between the first device and the second device, thereby increasing a data transmission rate. In addition, in response to the first device including a plurality of STAs, the protected data is constructed by using the addresses of the devices, and a change of the direct link does not affect the protected data. Therefore, in response to data being transmitted across a plurality of direct links, encryption is not to be performed again, thereby further increasing the data transmission rate.

For example, FIG. 15 is a schematic flowchart of another direct link addressing method according to at least one embodiment. An example in which a second device is used as a TDLS initiator is used for description. The direct link addressing method is applicable to communication between the STA device and the non-AP MLD 2 that are shown in FIG. 1 or between the non-AP MLD 1 and the non-AP MLD 2 that are shown in FIG. 1.

S1501: The second device determines protected data.

The protected data includes a first address, a second address, and a third address.

In some embodiments, in response to the first device including one STA, the first address is an address of a first device, the second address is an address of the second device, the third address is an address of a first AP of a third device, and the first device is connected to the first AP of the third device.

With reference to FIG. 8, in response to the first device including one STA, and the second device is used as the TDLS initiator, the first address, the second address, and the third address of the protected data are shown in Table 12. A difference from Table 6 in S701 lies in that configured content of the first address and configured content of the second address are exchanged, and a responder is the first device, so that the first address is an address of a legacy STA, for example, a legacy STA MAC address; and the initiator is the second device, so that the second address is an address of the non-AP MLD 2, for example, a non-AP MLD 2 MAC address. The third address is the same as the third address in Table 6, and the third address is an address of an AP 1, for example, a BSSID of the AP 1.

TABLE 12

| Scenario | Protected data | | |
|---|---|---|---|
| | First address | Second address | Third address |
| (legacy STA, non-AP MLD 2) | legacy STA MAC Address | non-AP MLD 2 MAC Address | BSSID of the AP 1 |

In some embodiments, in response to the first device including a plurality of STAs, the first address is an address of the first device, the second address is an address of the second device, and the third address is an address of the third device.

With reference to FIG. 9, in response to the first device including a plurality of STAs, and the second device being used as the TDLS initiator, the first address, the second address, and the third address of the protected data are shown in Table 13. Because the initiator and a responder change, a difference between Table 13 and Table 7 in S701 lies in that configured content of the first address and configured content of the second address are exchanged. For details, refer to Table 13. Details are not described herein.

TABLE 13

| Scenario | Protected data | | |
|---|---|---|---|
| | First address | Second address | Third address |
| (non-AP MLD 1, non-AP MLD 2) | non-AP MLD 1 MAC Address | non-AP MLD 2 MAC Address | AP MLD MAC Address |

S1502: The second device sends a first data unit.

The first data unit includes a first header, the first header is determined based on the protected data, and the first data unit is transmitted over a direct link between the first device and the second device.

For example, the first data unit is the MPDU shown in FIG. 6, and the first header is the MPDU header shown in FIG. 6.

Optionally, before or in a process in which the second device sends the first data unit in S1502, the first data unit is determined. Specifically, one or more of the following Manner 5 to Manner 8 are used.

Manner 5: The Second Device Determines the First Header of the First Data Unit.

Optionally, the first header includes a fourth address, a fifth address, and a sixth address.

For example, the first header is the MPDU header shown in FIG. 6. The fourth address is the address1 in the MPDU header, the fifth address is the address2 in the MPDU header, and the sixth address is the address3 in the MPDU header.

In some embodiments, in response to the first device including one STA, the fourth address is an address of the first device, the fifth address is an address of the second device, and the sixth address is an address of the first AP of the third device.

With reference to FIG. 8, in response to the first device including one STA, and the second device being used as the TDLS initiator, the fourth address, the fifth address, and the sixth address of the MPDU header are shown in Table 14. Because the initiator and the responder change, a difference between Table 14 and Table 8 in the foregoing Manner 1 lies in that configured content of the fourth address and configured content of the fifth address are exchanged. For details, see Table 14. Details are not described herein.

TABLE 14

| Scenario | First header | | |
|---|---|---|---|
| | Fourth address | Fifth address | Sixth address |
| (legacy STA, non-AP MLD 2) | legacy STA MAC Address | non-AP MLD 2 MAC Address | BSSID of the AP 1 |

In some embodiments, in response to the first device including a plurality of STAs, the fourth address is an address of a STA that corresponds to a first direct link and that is in the plurality of STAs of the first device, the fifth address is an address of a STA that corresponds to the first direct link and that is in a plurality of STAs of the second device, and the sixth address is an address of an AP that corresponds to the first direct link and that are in a plurality of APs of the third device. The first direct link is a direct link between the first device and the second device.

With reference to FIG. 9 and FIG. 10, in response to the first device including a plurality of STAs, and the second device being used as the TDLS initiator, the fourth address, the fifth address, and the sixth address of the MPDU header are shown in Table 15. Because the initiator and the responder change, a difference between Table 15 and Table 9 in the foregoing Manner 1 lies in that configured content of the fourth address and configured content of the fifth address are exchanged. For details, see Table 15. Details are not described herein.

In response to a plurality of direct links existing between the first device and the second device, the first direct link is a direct link for transmitting the first data unit in the direct links between the first device and the second device.

TABLE 15

| Scenario | First header | | |
|---|---|---|---|
| | Fourth address | Fifth address | Sixth address |
| (non-AP MLD 1, non-AP MLD 2) | affiliated STA 1 MAC address of the non-AP MLD 1 | affiliated STA 1 MAC address of the non-AP MLD 2 | Affiliated AP 1 BSSID of the AP MLD |

Manner 6: The Second Device Determines a First Element of the First Data Unit.

In some embodiments, the first data unit includes a TDLS frame, and the TDLS frame includes the first element. The first element indicates an identifier of a target link or an address of an AP that corresponds to the target link and that is in the plurality of APs of the third device. For example, the first element is set to a BSSID corresponding to the target link.

Optionally, the target link is a second direct link to which the TDLS frame is applied, and the second direct link is a direct link between the first device and the second device.

For specific implementations of Manner 6, the TDLS frame, and the first element, refer to the foregoing Manner 2. Details are not described herein again.

Manner 7: The Second Device Determines a Second Element of the First Data Unit.

In some embodiments, the first data unit includes a TDLS frame, and the TDLS frame includes a wakeup schedule element and the second element. An offset field in the wakeup schedule element is an offset relative to a first timing synchronization function threshold of a third direct link, the second element indicates an identifier of the third direct link or an address of an AP that corresponds to the third direct link and that is in the plurality of APs of the third device, and the third direct link is a direct link between the first device and the second device. For a specific implementation, refer to the corresponding implementation in the foregoing Manner 3. Details are not described herein again.

Similar to Manner 2 and Manner 3, Manner 6 and Manner 7 are used independently or in combination, and details are not described herein again.

TABLE 16

| TDLS frame | Transmission mode | Frame type | Note | First element<br>legacy STA and the non-AP MLD 2 | First element<br>non-AP MLD 1 and the non-AP MLD 2 |
|---|---|---|---|---|---|
| TDLS discovery request frame | Via AP | Data frame | MLD-level | Set to a BSSID corresponding to a reference link | Set to a BSSID corresponding to a reference link |
| TDLS discovery response frame | Direct | Management frame | Allow unsolicited sending MLD-level | Set to a BSSID corresponding to a transmission link for sending the TDLS discovery request frame | Set to a BSSID corresponding to a common link for transmitting the TDLS discovery response frame (the TDLS discovery response frame is transmitted over any common link) |
| TDLS setup request frame | Via AP | Data frame | MLD-level | Set to a BSSID of a link on which the legacy STA is located | Set to a BSSID corresponding to a reference link, and a BSSID in the TDLS setup request/respons e/confirm frame remains unchanged |
| TDLS setup response frame | Via AP | Data frame | MLD-level | Set to a BSSID of a link on which the legacy STA is located | |
| TDLS setup confirm frame | Via AP | Data frame | MLD-level | Set to a BSSID of a link on which the legacy STA is located | |
| TDLS teardown frame | Both allowed | Data frame | MLD-level; and if a direct link is unreachable, forwarding is performed by an AP | Set to a BSSID of a link on which the legacy STA is located | Set to an AP MLD MAC address or a BSSID of a direct link |
| TDLS channel switch request frame | Direct | Data frame | Link-level | Set to a BSSID of a link on which the legacy STA is located | Set to the BSSID corresponding to the target link |
| TDLS channel switch response frame | Direct | Data frame | Link-level | Set to a BSSID of a link on which the legacy STA is located | Set to the BSSID corresponding to the target link |
| TDLS peer power saving management request frame | Both allowed | Data frame | MLD-level | Set to a BSSID of a link on which the legacy STA is located | Set to a BSSID of the third direct link corresponding to the wakeup schedule element |

TABLE 16-continued

| TDLS frame | Transmission mode | Frame type | Note | First element: legacy STA and the non-AP MLD 2 | First element: non-AP MLD 1 and the non-AP MLD 2 |
|---|---|---|---|---|---|
| TDLS peer power saving management response frame | Direct | Data frame | MLD-level | Set to a BSSID of a link on which the legacy STA is located | Set to the BSSID of the third direct link corresponding to the wakeup schedule element |
| TDLS peer traffic indication frame | Via AP | Data frame | MLD-level | Set to a BSSID of a link on which the legacy STA is located | Set to the address of the third device, for example, an AP MLD MAC address |
| TDLS peer traffic response frame | Direct | Data frame | MLD-level | Set to a BSSID of a link on which the legacy STA is located | Set to the address of the third device, for example, an AP MLD MAC address |

For different TDLS frames, the following describes a configuration manner of the foregoing link identifier element or a newly defined element with reference to the foregoing Table 16. In other words, in response to TDLS frames being different frames, the link identifier element, the newly defined element, the BSSID field in the link identifier element, or a first field of the newly defined element correspond to different configured content. For ease of description, the link identifier element, the newly defined element, the first element, and the second element are collectively referred to as the first element below.

A main difference between a manner of configuring the first element in response to the second device being used as the TDLS initiator and a manner of configuring the first element in response to the first device being used as the TDLS initiator lies in a scenario in which the first device includes one STA and the TDLS frame is a TDLS discovery request frame.

For example, in response to the first device including one STA, and the TDLS frame being a TDLS discovery request frame, the first element indicates an identifier of a reference link, or an address of an AP that corresponds to the reference link and that is in the plurality of APs of the third device. The reference link is a link indicated by the BSSID field in the link identifier element. For example, the first element is set to the BSSID corresponding to the reference link.

In another scenario shown in Table 16, for a specific implementation of the first element, refer to the implementation of the corresponding first element in Table 10 in response to the first device being used as the TDLS initiator. Details are not described herein again.

For specific implementations of the reference link, the transmission link, and the common link, refer to corresponding implementations in the foregoing Manner 3. Details are not described herein again.

Manner 8: The Second Device Determines a Third Element of the First Data Unit.

Optionally, the first data unit includes the third element, the third element indicates to set up at least one fourth direct link on a first link, the first link is a common link of a link between the first device and the third device and a link between the second device and the third device, and the first link includes the at least one fourth direct link. For a specific implementation, refer to the corresponding implementation in the foregoing Manner 4. Details are not described herein again.

In at least one embodiment, a direct link is set up between the first device and the second device on a non-common link. In response to the direct link being set up on the non-common link, an implementation of the third element is similar to a specific implementation of the third element corresponding to a scenario in which a direct link is set up on the common link.

For example, the third element indicates to set up at least one fifth direct link on a second link. The second link is a link different from the link between the first device and the third device and the link between the second device and the third device, and the second link includes the at least one fifth direct link. In this way, the first device and the second device sets up a direct link on the non-common link, to increase a data transmission rate. For a specific implementation, refer to the corresponding implementation in the foregoing Manner 4. Details are not described herein again.

The foregoing Manner 5 to Manner 8 are used in combination with the direct link addressing method shown in FIG. 15, or the foregoing Manner 5 to Manner 8 is used independently or in combination with each other. This is not limited in at least one embodiment.

In some embodiments, a seventh address is bound to a TDLS peer key TPK. Optionally, the seventh address includes an address of an AP that corresponds to the direct link between the first device and the second device and that is in the plurality of APs of the third device or addresses of all the APs of the third device, and the address of the third device. For a specific implementation, refer to the implementation in which the first device binds the seventh address to the TPK. Details are not described herein again.

In at least one embodiment, the direct link addressing method provided in at least one embodiment further includes a TPK derivation process shown in the following step 3 and step 4. Step 3 and step 4 are used independently, or used in combination with the method, Manner 5, Manner 6, Manner 7, and/or Manner 8 shown in FIG. 15.

Step 3: The first device negotiates with the second device to determine an AKM suite selector. For a specific implementation, refer to the foregoing step 1, and details are not described herein again.

Step 4: The first device negotiates with the second device to derive the TDLS peer key TPK. For a specific implementation, refer to the foregoing step 2, and details are not described herein again.

The foregoing step 3 and step 4 also are applied to derivation of a pairwise master key (PTK), and the seventh address is bound to the PTK. Details are not described herein again.

In some embodiments, the first device and the second device complete TPK derivation handshake negotiation by exchanging a TDLS setup request/response/confirm frame (for details, refer to the following step d to step f). To be specific, the foregoing step 3 and step 4 is used in combination with the following step d to step f to complete TPK derivation handshake negotiation.

An example in which the second device is used as the TDLS initiator is used.

Step d to step f are similar to the foregoing step a to step c, and step d to step f respectively correspond to the foregoing step a to step c. A main difference lies in that the first device in the foregoing step a to step c is replaced with the second device, and the second device is replaced with the first device. Details are not described herein again.

According to the direct link addressing method described in FIG. 15, in response to the first device including one STA, the protected data is constructed by using the address of the first device, the address of the second device, and the address of the first AP connected to the first device. In response to the first device including a plurality of STAs, the protected data is constructed by using the address of the first device, the address of the second device, and the address of the third device. Therefore, the first device transmits the first data unit over the direct link between the first device and the second device, without forwarding by the third device, thereby increasing a data transmission rate. In addition, in response to the first device including a plurality of STAs, the protected data is constructed by using the addresses of the devices, and a change of the direct link does not affect the protected data. Therefore, in response to data being transmitted across a plurality of direct links, encryption is not performed again, thereby further increasing the data transmission rate.

Figure 16:
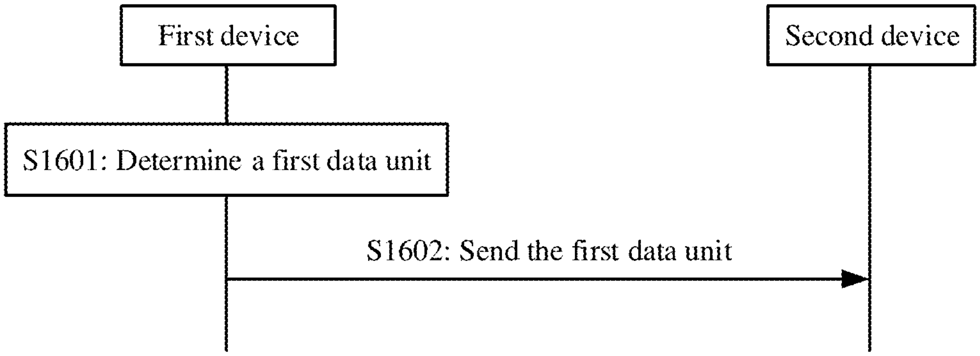
FIG. 16 is a schematic flowchart of still another direct link addressing method according to at least one embodiment.

For example, FIG. 16 is a schematic flowchart of still another direct link addressing method according to at least one embodiment. An example in which a first device is used as a TDLS initiator is used for description. The direct link addressing method is applicable to communication between the STA device and the non-AP MLD 2 that are shown in FIG. 1 or between the non-AP MLD 1 and the non-AP MLD 2 that are shown in FIG. 1.

S1601: The first device determines a first data unit.

The first data unit includes a first header, and the first header includes a fourth address, a fifth address, and a sixth address.

In some embodiments, the first data unit includes a frame body. For example, the frame body is a TDLS frame or data.

For example, the first data unit is the MPDU shown in FIG. 6, the first header is the MPDU header shown in FIG. 6, and the TDLS frame or the data is carried in the frame body field.

In some embodiments, in response to the first device including one STA, the fourth address is an address of a second device, the fifth address is an address of the first device, the sixth address is an address of a first AP of a third device, and the first device is connected to the first AP of the third device.

With reference to FIG. 8, the first AP is the AP 1 in FIG. 8. In response to the first device including one STA, and the first device being used as the TDLS initiator, the fourth address, the fifth address, and the sixth address of the MPDU header are shown in Table 17. The fourth address is an address of the non-AP MLD 2, for example, a non-AP MLD 2 MAC address. The fifth address is an address of a legacy STA, for example, a legacy STA MAC address. The sixth address is an address of the AP 1, for example, a BSSID of the AP 1.

TABLE 17

| | First header | | |
|---|---|---|---|
| Scenario | Fourth address | Fifth address | Sixth address |
| (legacy STA, non-AP MLD 2) | non-AP MLD 2 MAC Address | legacy STA MAC Address | BSSID of the AP 1 |

In some embodiments, in response to the first device including a plurality of STAs, the fourth address is an address of the second device, the fifth address is an address of the first device, and the sixth address is an address of an AP that corresponds to a sixth direct link and that is in a plurality of Aps of the third device, where the sixth direct link is a link for transmitting the first data unit between the first device and the second device. The first data unit is transmitted over a direct link between the first device and the second device.

For example, FIG. 9 and FIG. 10 show an example in which the first device is the non-AP MLD 1, the second device is the non-AP MLD 2, and the third device is the AP MLD. In response to the first device including a plurality of STAs, and the first device being used as the TDLS initiator, the fourth address, the fifth address, and the sixth address of the MPDU header are shown in Table 18. The first data unit is transmitted over a direct link 1, the fourth address is an address of a STA 1 of the non-AP MLD 2, for example, a non-AP MLD 2 MAC address; the fifth address is an address of a STA 1 of the non-AP MLD 1, for example, a non-AP MLD 1 MAC address; and the sixth address is an address of an AP 1 corresponding to the direct link 1, for example, an affiliated APi BSSID of the AP MLD.

TABLE 18

| | First header | | |
|---|---|---|---|
| Scenario | Fourth address | Fifth address | Sixth address |
| (legacy STA, non-AP MLD 2) | non-AP MLD 2 MAC Address | non-AP MLD 1 MAC Address | BSSID of the AP 1 |

Specifically, manners of configuring the sixth address corresponding to Table 17 and Table 18 is the same in both a case in which the first device includes one STA and a case in which the first device includes a plurality of STAs, to avoid frequent modification of configured content of the sixth address, thereby reducing a transmission delay.

Optionally, the TDLS frame is a TDLS discovery response frame.

Table 17 and Table 18 is address configuration manners of a first header of a management frame. Because the TDLS discovery response frame is encapsulated into a common management frame and is not encrypted, corresponding AAD construction is not determined.

S1602: The first device sends the first data unit. Correspondingly, the second device receives the first data unit from the first device.

According to the direct link addressing method described in FIG. 16, in response to the first device including one STA, the first header is constructed by using the address of the first device, the address of the second device, and the address of the first AP connected to the first device. In response to the first device including a plurality of STAs, the first header is constructed by using the address of the first device, the address of the second device, and the address of the AP that corresponds to the sixth direct link and that is in the plurality of APs of the third device, where the sixth direct link is a link for transmitting the first data unit between the first device and the second device. Therefore, the first device transmits the first data unit over the direct link between the first device and the second device, without forwarding by the third device, thereby increasing a data transmission rate. In addition, a manner of configuring the sixth address is the same in both a case in which the first device includes one STA and a case in which the first device includes a plurality of STAs, to avoid frequent modification of configured content of the sixth address, thereby further reducing a transmission delay.

Figure 17:
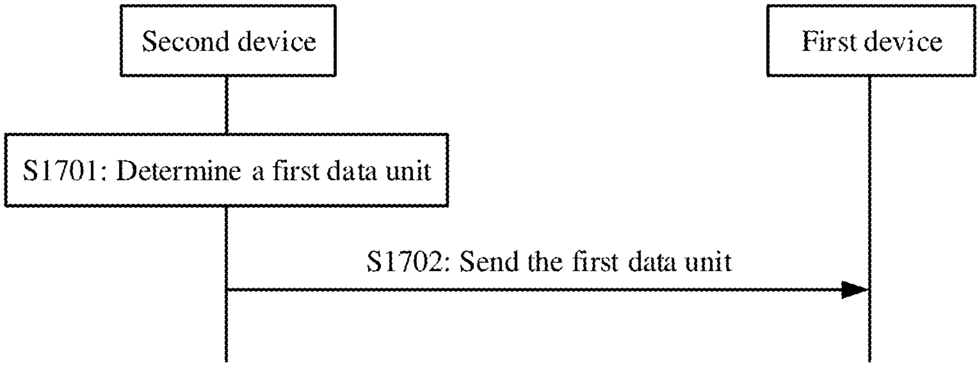
FIG. 17 is a schematic flowchart of still another direct link addressing method according to at least one embodiment.

For example, FIG. 17 is a schematic flowchart of still another direct link addressing method according to at least one embodiment. An example in which a second device is used as a TDLS initiator is used for description. The direct link addressing method is applicable to communication between the STA device and the non-AP MLD 2 that are shown in FIG. 1 or between the non-AP MLD 1 and the non-AP MLD 2 that are shown in FIG. 1.

S1701: The second device determines a first data unit.

The first data unit includes a first header, and the first header includes a fourth address, a fifth address, and a sixth address.

In at least one embodiment, the first data unit includes a frame body. For example, the frame body is a TDLS frame or data.

For example, the first data unit is the MPDU shown in FIG. 6, the first header is the MPDU header shown in FIG. 6, and the TDLS frame or the data is carried in a frame body field.

In some embodiments, in response to a first device including one STA, the fourth address is an address of the first device, the fifth address is an address of the second device, the sixth address is an address of a first AP of a third device, and the first device is connected to the first AP of the third device.

With reference to FIG. 8, in response to the first device including one STA, and the second device being used as the TDLS initiator, the fourth address, the fifth address, and the sixth address of the MPDU header are shown in Table 19. Because the initiator and a responder change, a difference between Table 19 and Table 17 in S1601 lies in that configured content of the fourth address and configured content of the fifth address are exchanged. For details, see Table 19. Details are not described herein.

TABLE 19

| | First header | | |
|---|---|---|---|
| Scenario | Fourth address | Fifth address | Sixth address |
| (legacy STA, non-AP MLD 2) | legacy STA MAC Address | non-AP MLD 2 MAC Address | BSSID of an AP 1 |

In some embodiments, in response to the first device including a plurality of STAs, the fourth address is an address of the first device, the fifth address is an address of the second device, and the sixth address is an address of an AP that corresponds to a sixth direct link and that is in a plurality of APs of a third device, where the sixth direct link is a link for transmitting the first data unit between the first device and the second device. The first data unit is transmitted over a direct link between the first device and the second device.

With reference to FIG. 9 and FIG. 10, in response to the first device including a plurality of STAs, and the second device being used as the TDLS initiator, the fourth address, the fifth address, and the sixth address of the MPDU header are shown in Table 20. Because the initiator and a responder change, a difference between Table 20 and Table 18 in S1601 lies in that configured content of the fourth address and configured content of the fifth address are exchanged. For details, see Table 20. Details are not described herein.

TABLE 20

| | First header | | |
|---|---|---|---|
| Scenario | Fourth address | Fifth address | Sixth address |
| (non-AP MLD 1, non-AP MLD 2) | affiliated STA 1 MAC address of the non-AP MLD 1 | affiliated STA 1 MAC address of the non-AP MLD 2 | Affiliated AP 1 BSSID of the AP MLD |

Optionally, the TDLS frame is a TDLS discovery response frame.

S1702: The second device sends the first data unit. Correspondingly, the first device receives the first data unit from the second device.

For a technical effect of the method shown in FIG. 17, refer to a technical effect of the method shown in FIG. 16. Details are not described herein again.

An address configuration rule of the first data unit (for example, an MPDU) and protected data (for example, an AAD) construction provided in at least one embodiment is applicable to a unicast frame.

The following describes several special application scenarios to which embodiments described herein are applicable. Application scenarios of embodiments described herein are not limited to the following several application scenarios.

Scenario 1

The AP MLD corresponds to three links: a link 1, a link 2, and a link 3. Two links, the link 1 and the link 2, are set up between the non-AP MLD 1 and the AP MLD, and the link 1 and the link 3 are set up between the non-AP MLD 2 and the AP MLD. In this case, the non-AP MLD 1 and the non-AP MLD 2 set up multi-link TDLS. The link 1 is referred to as a common link, and the other link is referred to as a non-common link. A link identifier corresponding to the link 1 is indicated by a link ID or a BSSID of an AP associated with either end of the link. For data transmission on the non-common link, two ends of the non-common link negotiate, through the common link, on which channel data is transmitted. For example, in response to the non-common link being switched to a channel on which one end is located for transmission, a peer end is equivalent to off-channel transmission, and the peer end notifies the AP that the peer end enters a doze state, and then switches to a channel on which the other end is located for direct transmission.

In the foregoing scenario, at least one common link exists to set up a direct link between non-AP MLDs. Otherwise, a TDLS discovery response frame is not allowed to be replied or TDLS setup is initiated. In response to a plurality of common links existing between non-AP MLDs, the TDLS discovery response frame is replied over any common link. However, in response to a link corresponding to the BSSID field in the link identifier element also being a common link, the TDLS discovery response frame is preferably replied over the common link.

In addition, non-AP MLDs on both ends use different address modes, such as transparent transmission mode and non-transparent transmission mode.

Scenario 2

The AP MLD corresponds to three links: a link 1, a link 2, and a link 3. Two links, the link 1 and the link 2, are set up between the non-AP MLD 1 and the AP MLD, and the legacy STA is associated with the link 2. In response to the non-AP MLD, as an initiator, sending a TDLS discovery request frame, and a BSSID in a link identifier element carried in the TDLS discovery request frame being set to a BSSID corresponding to the link 1, after receiving the TDLS discovery request frame, in response to the legacy STA finding that the BSSID in the link identifier element is inconsistent with a BSSID in which the legacy STA is located, the legacy STA does not return a TDLS discovery response frame on the link 2, resulting in a discovery failure. This situation occurs because the non-AP MLD does not know whether a peer end is a legacy STA or a non-AP MLD, and does not know which AP the peer end is associated with.

To avoid this situation, the non-AP MLD resends a TDLS discovery request frame, and a BSSID in a link identifier element carried in the TDLS discovery request frame is set to a BSSID corresponding to the link 2. In this way, after receiving the TDLS discovery request frame, in response to the legacy STA finding that the BSSID in the link identifier element is consistent with the BSSID in which the legacy STA is located, the legacy STA returns a TDLS discovery response frame on the link 2, so that discovery succeeds.

Scenario 3

The AP MLD corresponds to three links: a link 1, a link 2, and a link 3. Two links, the link 1 and the link 2, are set up between the non-AP MLD 1 and the AP MLD, and the legacy STA is associated with the link 2. In response to the legacy STA, as an initiator, sending a TDLS discovery request frame on the link 2, after receiving the TDLS discovery request frame, the non-AP MLD returns a TDLS discovery response frame only over a link (namely, the link 2) indicated by a BSSID in a link identifier element.

In response to both the TDLS initiator and the TDLS responder being MLDs, the TDLS discovery request frame and the TDLS discovery response frame each carry a multi-link element. In this way, both ends know that a peer end is also an MLD device through a TDLS discovery process. In addition, through the TDLS discovery process, the TDLS initiator and the TDLS responder knows which links are common links.

The direct link addressing method provided in embodiments described herein is described above in detail with reference to FIG. 7 to FIG. 17. The following describes in detail a direct link addressing apparatus provided in embodiments described herein with reference to FIG. 18 and FIG. 19.

Figure 18:
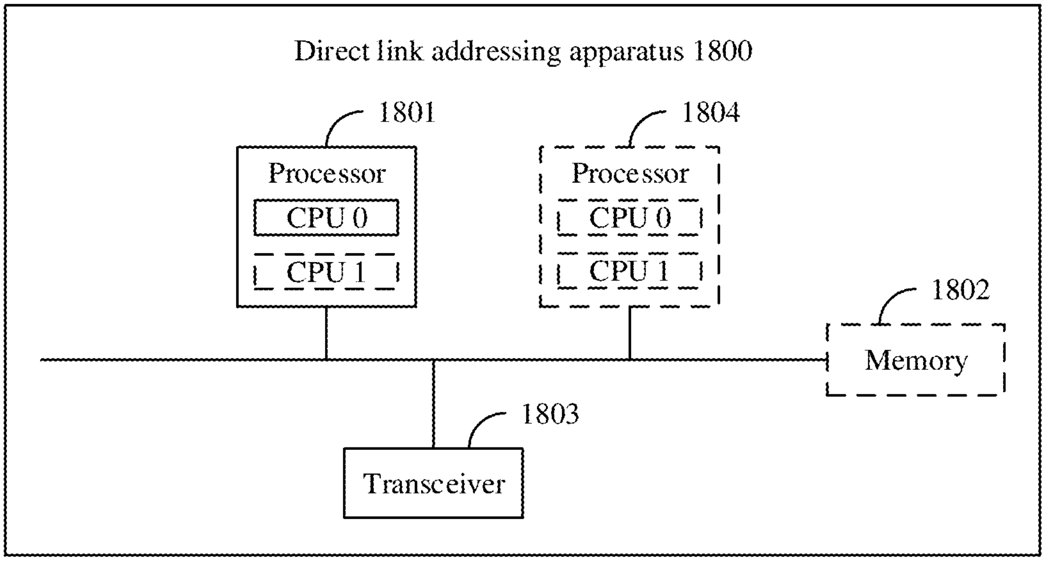
FIG. 18 is a schematic diagram of a structure of a direct link addressing apparatus according to at least one embodiment.

FIG. 18 is a schematic diagram of a structure of a direct link addressing apparatus that is configured to perform the direct link addressing method provided in embodiments described herein. A direct link addressing apparatus 1800 is a first device or a second device, or is a chip applied to a first device or a second device or another component having a corresponding function. As shown in FIG. 18, the direct link addressing apparatus 1800 includes a processor 1801 and a transceiver 1803. The direct link addressing apparatus 1800 further includes a memory 1802. The processor 1801 is coupled to the memory 1802 and the transceiver 1803. For example, the processor 1801 is connected to the memory 1802 and the transceiver 1803 through a communication bus. The processor 1801 is alternatively independently used.

The following describes each component of the direct link addressing apparatus 1800 in detail with reference to FIG. 18.

The processor 1801 is a control center of the direct link addressing apparatus 1800; and is one processor, or is a collective term of a plurality of processing elements. For example, the processor 1801 is one or more central processing units (CPU), or is an application-specific integrated circuit (ASIC), or is configured as one or more integrated circuits for implementing embodiments described herein, for example, one or more microprocessors (DSP) or one or more field programmable gate arrays (FPGA).

The processor 1801 executes various functions of the direct link addressing apparatus 1800 by running or executing a software program stored in the memory 1802 and invoking data stored in the memory 1802.

During specific implementation, in an embodiment, the processor 1801 includes one or more CPUs, such as a CPU 0 and a CPU 1 that are shown in FIG. 18.

During specific implementation, in an embodiment, the direct link addressing apparatus 1800 alternatively includes a plurality of processors, for example, the processor 1801 and a processor 1804 that are shown in FIG. 18. Each of the processors is a single-core processor (single-CPU) or is a multi-core processor (multi-CPU). The processor herein is one or more communication devices, circuits, and/or processing cores configured to process data (for example, computer program instructions).

The memory 1802 is a read-only memory (ROM) or another type of static storage communication device that stores static information and instructions, a random access memory (RAM) or another type of dynamic storage communication device that stores information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that is used for carrying or storing expected program code in a form of an instruction or a data structure and that is accessed by a computer. However, the memory 1802 is not limited thereto. The memory 1802 is integrated with the processor 1801; or exists independently, and is coupled to the processor 1801 through an input/output port (not shown in FIG. 18) of the direct link addressing apparatus 1800. This is not specifically limited in at least one embodiment.

The memory 1802 is configured to store a software program for executing the solutions of at least one embodiment, and the processor 1801 controls execution. For the foregoing specific implementation, refer to the following method embodiments. Details are not described herein again.

The transceiver 1803 is configured to communicate with another direct link addressing apparatus. For example, in response to the direct link addressing apparatus 1800 being the first device, the transceiver 1803 is configured to communicate with the second device and a third device. For another example, in response to the direct link addressing apparatus 1800 being the second device, the transceiver 1803 is configured to communicate with the first device and the third device. In addition, the transceiver 1803 includes a receiver and a transmitter (not separately shown in FIG. 18). The receiver is configured to implement a receiving function, and the transmitter is configured to implement a sending function. The transceiver 1803 is integrated with the processor 1801; or exits independently, and is coupled to the processor 1801 through the input/output port (not shown in FIG. 18) of the direct link addressing apparatus 1800. This is not specifically limited in at least one embodiment.

A structure of the direct link addressing apparatus 1800 shown in FIG. 18 does not constitute a limitation on the direct link addressing apparatus. An actual direct link addressing apparatus includes more or fewer components than those shown in the figure, or combine some components, or have different component arrangements.

Actions of the first device in the foregoing steps S701 and S702 and S1601 and S1602 are performed by the processor 1801 in the direct link addressing apparatus 1800 shown in FIG. 18 by invoking application program code stored in the memory 1802 to indicate a remote terminal device to perform.

Actions of the second device in the foregoing steps S1501 and S1502 and S1701 and S1702 are performed by the processor 1801 in the direct link addressing apparatus 1800 shown in FIG. 18 by invoking the application program code stored in the memory 1802 to indicate the remote terminal device to perform. This is not limited in this embodiment.

Figure 19:
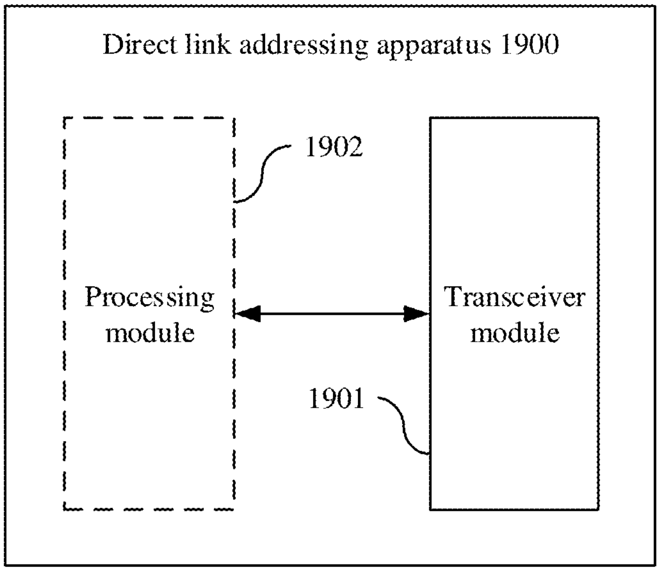
FIG. 19 is a schematic diagram of a structure of another direct link addressing apparatus according to at least one embodiment.

FIG. 19 is a schematic diagram of a structure of another direct link addressing apparatus according to at least one embodiment. For ease of description, FIG. 19 shows only main components of the direct link addressing apparatus.

A direct link addressing apparatus 1900 includes a transceiver module 1901. Optionally, the direct link addressing apparatus 1900 further includes a processing module 1902. The direct link addressing apparatus 1900 is the first device or the second device in the foregoing method embodiments. The transceiver module 1901 is also be to as a transceiver unit, and is configured to implement a transceiver function performed by the first device or the second device in any one of the foregoing method embodiments.

The transceiver module 1901 includes a receiving module and a sending module (not shown in FIG. 19). The receiving module is configured to implement a receiving function performed by the first device or the second device in any one of the foregoing method embodiments. The sending module is configured to implement a sending function performed by the first device or the second device in any one of the foregoing method embodiments. A specific implementation of the transceiver module 1901 is not specifically limited in at least one embodiment.

The processing module 1902 is also referred to as a processing unit, and is configured to implement a processing function performed by the first device or the second device in any one of the foregoing method embodiments. The processing module 1902 is a processor.

In this embodiment, the direct link addressing apparatus 1900 is presented in a form of dividing each functional module in an integrated manner. The "module" herein is a specific ASIC, a circuit, a processor that executes one or more software or firmware programs, a memory, an integrated logic circuit, and/or another component capable of providing the foregoing functions. In a simple embodiment, a person skilled in the art is able to figure out that the direct link addressing apparatus 1900 is in a form of the direct link addressing apparatus 1800 shown in FIG. 18.

For example, the processor 1801 in the direct link addressing apparatus 1800 shown in FIG. 18 invokes computer-executable instructions stored in the memory 1802, so that the direct link addressing apparatus 1800 performs the direct link addressing method in the foregoing method embodiments.

Specifically, a function/implementation process of the transceiver module 1901 and the processing module 1902 in FIG. 19 is implemented by the processor 1801 in the direct link addressing apparatus 1800 shown in FIG. 18 by invoking the computer-executable instructions stored in the memory 1802. Alternatively, a function/implementation process of the processing module 1902 in FIG. 19 is implemented by the processor 1801 in the direct link addressing apparatus 1800 shown in FIG. 18 by invoking the computer-executable instructions stored in the memory 1802, and a function/implementation process of the transceiver module 1901 in FIG. 19 is implemented by the transceiver 1803 in the direct link addressing apparatus 1800 shown in FIG. 18.

Because the direct link addressing apparatus 1900 provided in this embodiment executes the foregoing direct link addressing method, for technical effects that are achieved by the direct link addressing apparatus 1900, refer to the foregoing method embodiments. Details are not described herein again.

In at least one embodiment, the direct link addressing apparatus 1900 shown in FIG. 19 is applicable to the communication system shown in FIG. 1, and perform a function of the first device in the direct link addressing method shown in FIG. 7. The direct link addressing apparatus 1900 includes one or more stations STAs. The direct link addressing apparatus 1900 is connected to a third device, and the third device includes a plurality of access points APs. The second device is connected to the third device, and the second device includes a plurality of STAs.

The processing module 1902 is configured to determine protected data. The protected data includes a first address, a second address, and a third address. In response to the direct link addressing apparatus 1900 including one STA, the first address is an address of the second device, the second address is an address of the direct link addressing apparatus 1900, the third address is an address of a first AP of the third device, and the direct link addressing apparatus 1900 is connected to the first AP of the third device. In response to the direct link addressing apparatus 1900 including a plurality of STAs, the first address is an address of the second device, the second address is an address of the direct link addressing apparatus 1900, and the third address is an address of the third device.

The transceiver module 1901 is configured to send a first data unit. The first data unit includes a first header, the first header is determined based on the protected data, and the first data unit is transmitted over a direct link between the direct link addressing apparatus 1900 and the second device.

Optionally, the direct link addressing apparatus 1900 further includes a storage module (not shown in FIG. 19), and the storage module stores programs or instructions. In response to the processing module 1902 executing the programs or the instructions, the direct link addressing apparatus 1900 performs the function of the first device in the direct link addressing method shown in FIG. 7.

The direct link addressing apparatus 1900 is the first device, or is a chip (system) or another component or assembly that is disposed in the first device. This is not limited in at least one embodiment.

In addition, for a technical effect of the direct link addressing apparatus 1900, refer to a technical effect of the direct link addressing method shown in FIG. 7. Details are not described herein again.

In at least one embodiment, the direct link addressing apparatus 1900 shown in FIG. 19 is applicable to the communication system shown in FIG. 1, and perform a function of the second device in the direct link addressing method shown in FIG. 7. The direct link addressing apparatus 1900 includes a plurality of stations STAs. The direct link addressing apparatus 1900 is connected to a third device, and the third device includes a plurality of access points APs. The first device is connected to the third device, and the first device includes one or more STAs.

The transceiver module 1901 is configured to receive a first data unit. The first data unit includes a first header, the first header is determined based on protected data, and the first data unit is transmitted over a direct link between the first device and the direct link addressing apparatus 1900. The protected data includes a first address, a second address, and a third address. In response to the first device including one STA, the first address is an address of the direct link addressing apparatus 1900, the second address is an address of the first device, the third address is an address of a first AP of the third device, and the first device is connected to the first AP of the third device. In response to the first device including a plurality of STAs, the first address is an address of the direct link addressing apparatus 1900, the second address is an address of the first device, and the third address is an address of the third device.

Optionally, the direct link addressing apparatus 1900 further includes the processing module 1902 and a storage module (not shown in FIG. 19), and the storage module stores programs or instructions. In response to the processing module 1902 executing the programs or the instructions, the direct link addressing apparatus 1900 performs the function of the second device in the direct link addressing method shown in FIG. 7.

The direct link addressing apparatus 1900 is the second device, or is a chip (system) or another component or assembly that is disposed in the second device. This is not limited in at least one embodiment.

In addition, for a technical effect of the direct link addressing apparatus 1900, refer to a technical effect of the direct link addressing method shown in FIG. 7. Details are not described herein again.

In still at least one embodiment, the direct link addressing apparatus 1900 shown in FIG. 19 is applicable to the communication system shown in FIG. 1, and perform a function of the second device in the direct link addressing method shown in FIG. 15. The direct link addressing apparatus 1900 includes a plurality of stations STAs, the direct link addressing apparatus 1900 is connected to a third device, the third device includes a plurality of access points APs, the first device is connected to the third device, and the first device includes one or more STAs.

The processing module 1902 is configured to determine protected data. The protected data includes a first address, a second address, and a third address. In response to the first device including one STA, the first address is an address of the first device, the second address is an address of the direct link addressing apparatus 1900, the third address is an address of a first AP of the third device, and the first device is connected to the first AP of the third device. In response to the first device including a plurality of STAs, the first address is an address of the first device, the second address is an address of the direct link addressing apparatus 1900, and the third address is an address of the third device.

The transceiver module 1901 is configured to send a first data unit. The first data unit includes a first header, the first header is determined based on the protected data, and the first data unit is transmitted over a direct link between the first device and the direct link addressing apparatus 1900.

Optionally, the direct link addressing apparatus 1900 further includes a storage module (not shown in FIG. 19), and the storage module stores programs or instructions. In response to the processing module 1902 executing the programs or the instructions, the direct link addressing apparatus 1900 performs a function of the second device in the direct link addressing method shown in FIG. 15.

The direct link addressing apparatus 1900 is the second device, or is a chip (system) or another component or assembly that is disposed in the second device. This is not limited in at least one embodiment.

In addition, for a technical effect of the direct link addressing apparatus 1900, refer to a technical effect of the direct link addressing method shown in FIG. 15. Details are not described herein again.

In still at least one embodiment, the direct link addressing apparatus 1900 shown in FIG. 19 is applicable to the communication system shown in FIG. 1, and perform a function of the first device in the direct link addressing method shown in FIG. 15. The direct link addressing apparatus 1900 includes one or more stations STAs. The direct link addressing apparatus 1900 is connected to a third device, the third device includes a plurality of access points APs, the second device is connected to the third device, and the second device includes a plurality of STAs.

The transceiver module 1901 is configured to receive a first data unit. The first data unit includes a first header, the first header is determined based on the protected data, and the first data unit is transmitted over a direct link between the direct link addressing apparatus 1900 and the second device. The protected data includes a first address, a second address, and a third address. In response to the direct link addressing apparatus 1900 including one STA, the first address is an address of the direct link addressing apparatus 1900, the second address is an address of the second device, and the third address is an address of a first AP of the third device, the direct link addressing apparatus 1900 is connected to the first AP of the third device, and the direct link addressing apparatus 1900 includes one STA. In response to the direct link addressing apparatus 1900 including a plurality of STAs, the first address is an address of the direct link addressing apparatus 1900, the second address is an address of the second device, and the third address is an address of the third device.

Optionally, the direct link addressing apparatus 1900 further includes a processing module 1902 and a storage module (not shown in FIG. 19), and the storage module stores programs or instructions. In response to the processing module 1902 executing the programs or the instructions, the direct link addressing apparatus 1900 performs a function of the first device in the direct link addressing method shown in FIG. 15.

The direct link addressing apparatus 1900 is the first device, or is a chip (system) or another component or assembly that is disposed in the first device. This is not limited in at least one embodiment.

In addition, for a technical effect of the direct link addressing apparatus 1900, refer to a technical effect of the direct link addressing method shown in FIG. 15. Details are not described herein again.

In still at least one embodiment, the direct link addressing apparatus 1900 shown in FIG. 19 is applicable to the communication system shown in FIG. 1, and perform a function of the first device in the direct link addressing method shown in FIG. 16. The direct link addressing apparatus 1900 includes one or more stations STAs. The direct link addressing apparatus 1900 is connected to a third device, the third device includes a plurality of access points APs, the second device is connected to the third device, and the second device includes a plurality of STAs.

The processing module 1902 is configured to determine the first data unit. The first data unit includes a first header and a tunneled direct-link setup TDLS frame, and the first header includes a fourth address, a fifth address, and a sixth address. In response to the direct link addressing apparatus 1900 including one STA, the fourth address is an address of the second device, the fifth address is an address of the direct link addressing apparatus 1900, the sixth address is an address of the first AP of the third device, and the direct link addressing apparatus 1900 is connected to the first AP of the third device. In response to the direct link addressing apparatus 1900 including a plurality of STAs, the fourth address is an address of the second device, the fifth address is an address of the direct link addressing apparatus 1900, the sixth address is an address of an AP that corresponds to a sixth direct link and that is in the plurality of APs of the third device, and the sixth direct link is a link for transmitting the TDLS frame between the direct link addressing apparatus 1900 and the second device.

The transceiver module 1901 is configured to send a first data unit. The first data unit is transmitted over a direct link between the direct link addressing apparatus 1900 and the second device.

Optionally, the TDLS frame is a TDLS discovery response frame.

Optionally, the direct link addressing apparatus 1900 further includes a storage module (not shown in FIG. 19), and the storage module stores programs or instructions. In response to the processing module 1902 executing the programs or the instructions, the direct link addressing apparatus 1900 performs a function of the first device in the direct link addressing method shown in FIG. 16.

The direct link addressing apparatus 1900 is the first device, or is a chip (system) or another component or assembly that is disposed in the first device. This is not limited in at least one embodiment.

In addition, for a technical effect of the direct link addressing apparatus 1900, refer to a technical effect of the direct link addressing method shown in FIG. 16. Details are not described herein again.

In still at least one embodiment, the direct link addressing apparatus 1900 shown in FIG. 19 is applicable to the communication system shown in FIG. 1, and perform a function of the second device in the direct link addressing method shown in FIG. 16. The direct link addressing apparatus 1900 includes a plurality of stations STAs. The direct link addressing apparatus 1900 is connected to a third device, and the third device includes a plurality of access points APs. The first device is connected to the third device, and the first device includes one or more STAs.

The transceiver module 1901 is configured to receive a first data unit. The first data unit includes a first header and a tunneled direct-link setup TDLS frame, and the first header includes a fourth address, a fifth address, and a sixth address.

In response to the first device including one STA, the fourth address is an address of the direct link addressing apparatus 1900, the fifth address is an address of the first device, the sixth address is an address of a first AP of the third device, and the first device is connected to the first AP of the third device. In response to the first device including a plurality of STAs, the fourth address is an address of the direct link addressing apparatus 1900, the fifth address is an address of the first device, the sixth address is an address of an AP that corresponds to a sixth direct link and that is in the plurality of APs of the third device, and the sixth direct link is a link for transmitting the TDLS frame between the first device and the direct link addressing apparatus 1900. The first data unit is transmitted over a direct link between the first device and the direct link addressing apparatus 1900.

Optionally, the TDLS frame is a TDLS discovery response frame.

Optionally, the direct link addressing apparatus 1900 further includes the processing module 1902 and a storage module (not shown in FIG. 19), and the storage module stores programs or instructions. In response to the processing module 1902 executing the programs or the instructions, the direct link addressing apparatus 1900 performs the function of the second device in the direct link addressing method shown in FIG. 16.

The direct link addressing apparatus 1900 is the second device, or is a chip (system) or another component or assembly that is disposed in the second device. This is not limited in at least one embodiment.

In addition, for a technical effect of the direct link addressing apparatus 1900, refer to a technical effect of the direct link addressing method shown in FIG. 16. Details are not described herein again.

In still at least one embodiment, the direct link addressing apparatus 1900 shown in FIG. 19 is applicable to the communication system shown in FIG. 1, and perform a function of the second device in the direct link addressing method shown in FIG. 17. The direct link addressing apparatus 1900 includes a plurality of stations STAs. The direct link addressing apparatus 1900 is connected to a third device, and the third device includes a plurality of access points APs. The first device is connected to the third device, and the first device includes one or more STAs.

The processing module 1902 is configured to determine a first data unit. The first data unit includes a first header and a tunneled direct-link setup TDLS frame, and the first header includes a fourth address, a fifth address, and a sixth address.

The transceiver module 1901 is configured to send the first data unit. In response to the first device including one STA, the fourth address is an address of the first device, the fifth address is an address of the direct link addressing apparatus 1900, the sixth address is an address of a first AP of the third device, and the first device is connected to the first AP of the third device. In response to the first device including a plurality of STAs, the fourth address is an address of the first device, the fifth address is an address of the direct link addressing apparatus 1900, and the sixth address is an address of an AP that corresponds to a sixth direct link and that is in the plurality of APs of the third device. The sixth direct link is a link for transmitting the TDLS frame between the first device and the direct link addressing apparatus 1900. The first data unit is transmitted over a direct link between the first device and the direct link addressing apparatus 1900.

Optionally, the TDLS frame is a TDLS discovery response frame.

Optionally, the direct link addressing apparatus 1900 further includes the processing module 1902 and a storage module (not shown in FIG. 19), and the storage module stores programs or instructions. In response to the processing module 1902 executing the programs or the instructions, the direct link addressing apparatus 1900 performs the function of the second device in the direct link addressing method shown in FIG. 17.

The direct link addressing apparatus 1900 is the second device, or is a chip (system) or another component or assembly that is disposed in the second device. This is not limited in at least one embodiment.

In addition, for a technical effect of the direct link addressing apparatus 1900, refer to a technical effect of the direct link addressing method shown in FIG. 17. Details are not described herein again.

In still at least one embodiment, the direct link addressing apparatus 1900 shown in FIG. 19 is applicable to the communication system shown in FIG. 1, and perform a function of the first device in the direct link addressing method shown in FIG. 17. The direct link addressing apparatus 1900 includes one or more stations STAs. The direct link addressing apparatus 1900 is connected to a third device, and the third device includes a plurality of access points APs. The second device is connected to the third device, and the second device includes a plurality of STAs.

The transceiver module 1901 is configured to receive a first data unit. The first data unit includes a first header and a tunneled direct-link setup TDLS frame, and the first header includes a fourth address, a fifth address, and a sixth address.

In response to the direct link addressing apparatus 1900 including one STA, the fourth address is an address of the direct link addressing apparatus 1900, the fifth address is an address of the second device, the sixth address is an address of a first AP of the third device, and the direct link addressing apparatus 1900 is connected to the first AP of the third device. In response to the direct link addressing apparatus 1900 including a plurality of STAs, the fourth address is an address of the direct link addressing apparatus 1900, the fifth address is an address of the second device, and the sixth address is an address of an AP that corresponds to a sixth direct link and that is in the plurality of APs of the third device. The sixth direct link is a link for transmitting the TDLS frame between the direct link addressing apparatus 1900 and the second device. The first data unit is transmitted over a direct link between the direct link addressing apparatus 1900 and the second device.

Optionally, the TDLS frame is a TDLS discovery response frame.

Optionally, the direct link addressing apparatus 1900 further includes the processing module 1902 and a storage module (not shown in FIG. 19), and the storage module stores programs or instructions. In response to the processing module 1902 executing the programs or the instructions, the direct link addressing apparatus 1900 performs the function of the first device in the direct link addressing method shown in FIG. 17.

The direct link addressing apparatus 1900 is the first device, or is a chip (system) or another component or assembly that is disposed in the first device. This is not limited in at least one embodiment.

In addition, for a technical effect of the direct link addressing apparatus 1900, refer to a technical effect of the direct link addressing method shown in FIG. 17. Details are not described herein again.

At least one embodiment provides a communication system. The communication system includes a first device and a second device. The communication system further includes a third device. The first device is configured to perform actions of the first device in the foregoing method embodiments. For a specific execution method and process, refer to the foregoing method embodiments. Details are not described herein again. The second device is configured to perform actions of the second device in the foregoing method embodiments. For a specific execution method and process, refer to the foregoing method embodiments. Details are not described herein again. The third device is configured to perform actions of the third device in the foregoing method embodiments. For a specific execution method and process, refer to the foregoing method embodiments. Details are not described herein again.

At least one embodiment provides a chip system. The chip system includes a processor and an input/output port. The processor is configured to implement a processing function in the direct link addressing method provided in embodiments described herein. The input/output port is configured to implement a transceiver function in the direct link addressing method provided in embodiments described herein.

In at least one embodiment, the chip system further includes a memory. The memory is configured to store program instructions and data for implementing a function in the direct link addressing method provided in embodiments described herein.

The chip system includes a chip, or includes a chip and another discrete component.

An embodiment of this application provides a computer-readable storage medium. The computer-readable storage medium includes computer programs or instructions. In response to the computer programs or the instructions being run on a computer, the computer is enabled to perform the direct link addressing method provided in embodiments described herein.

At least one embodiment provides a computer program product. The computer program product includes computer programs or instructions. In response to the computer programs or the instructions being run on a computer, the computer is enabled to perform the direct link addressing method provided in embodiments described herein.

The processor in embodiments described herein is a central processing unit (CPU), or is another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor is a microprocessor, or the processor is any conventional processor or the like.

The memory in embodiments described herein is a volatile memory or a nonvolatile memory, or includes a volatile memory and a nonvolatile memory. The nonvolatile memory is a read-only memory (ROM), a programmable read-only memory (PROM), an erasable programmable read-only memory (EPROM), an electrically erasable programmable read-only memory (EEPROM), or a flash memory. The volatile memory is a random access memory (random access memory, RAM), used as an external cache. Through an example rather than a limitative description, random access memories (RAM) in many forms is used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments are implemented by using software, hardware (for example, circuit), firmware, or any combination thereof. In response to software being used to implement embodiments, the foregoing embodiments are implemented completely or partially in a form of a computer program product. The computer program product includes one or more computer instructions or computer programs. In response to the program instructions or the computer programs being loaded and executed on a computer, the procedures or functions according to embodiments described herein are all or partially generated. The computer is a general-purpose computer, a special-purpose computer, a computer network, or other programmable apparatuses. The computer instructions are stored in a computer-readable storage medium or are transmitted from a computer-readable storage medium to another computer-readable storage medium. For example, the computer instructions are transmitted from a website, computer, server, or data center to another website, computer, server, or data center in a wired (for example, infrared, radio, or microwave) manner. The computer-readable storage medium is any usable medium accessible by a computer, or a data storage device, such as a server or a data center, integrating one or more usable media. The usable medium is a magnetic medium (for example, a floppy disk, a hard disk, or a magnetic tape), an optical medium (for example, a DVD), or a semiconductor medium. The semiconductor medium is a solid-state drive.

The term "and/or" in this specification describes only an association relationship between associated objects, and indicates that there is three relationships. For example, A and/or B indicates the following three cases: Only A exists, both A and B exist, and only B exists. A and B is singular or plural. In addition, the character "/" in this specification usually indicates an "or" relationship between associated objects, or indicates an "and/or" relationship. A specific meaning depends on the context.

In at least one embodiment, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c indicates: a, b, c, a-b, a-c, b-c, or a-b-c, where a, b, and c is singular or plural.

Sequence numbers of the foregoing processes do not mean execution sequences in various embodiments described herein. The execution sequences of the processes should be determined based on functions and internal logic of the processes, and should not be construed as any limitation on the implementation processes of embodiments described herein.

A person of ordinary skill in the art is aware that, in combination with the examples described in at least one embodiment, units and algorithm steps is implemented by electronic hardware or a combination of computer software and electronic hardware. Whether the functions are performed by hardware or software depends on particular applications and design constraints of the technical solutions. A person skilled in the art are able to use different methods to implement the described functions for each particular application, but the implementation does not go beyond the scope of this application.

A person skilled in the art understands that, for the purpose of convenient and brief description, for a detailed working process of the foregoing system, apparatus, and unit, refer to a corresponding process in the foregoing method embodiments, and details are not described herein again.

In at least one embodiment, the disclosed system, apparatus, and method is implemented in other manners. For example, the described apparatus embodiment is merely an example. For example, division into the units is merely logical function division and is other division in actual implementation. For example, a plurality of units or components is combined or integrated into another system, or some features are ignored or not performed. In addition, the displayed or discussed mutual couplings or direct couplings or communication connections are implemented through some interfaces. The indirect couplings or communication connections between the apparatuses or units are implemented in electronic, mechanical, or other forms.

The units described as separate parts may or may not be physically separate, and parts displayed as units may or may not be physical units, are located in one position, or are distributed on a plurality of network units. Some or all of the units are selected based on actual usage to achieve the objectives of the solutions of embodiments.

In addition, functional units in embodiments described herein is integrated into one processing unit, or each of the units exist alone physically, or two or more units are integrated into one unit.

In response to the functions are implemented in a form of a software functional unit and sold or used as an independent product, the functions are stored in a computer-readable storage medium. Based on such an understanding, the technical solutions of at least one embodiment essentially, or the part contributing to the conventional technology, or some of the technical solutions are implemented in a form of a computer software product. The computer software product is stored in a storage medium, and includes several instructions for instructing a computer device (which are a personal computer, a server, or a network device) to perform all or some of the steps of the methods described in embodiments described herein. The foregoing storage medium includes any medium that stores program code, such as a USB flash drive, a removable hard disk, a read-only memory (ROM), a random access memory (RAM), a magnetic disk, or an optical disc.

The foregoing descriptions are merely specific implementations of at least one embodiment, but are not intended to limit the protection scope of the claims. Any variation or replacement readily figured out by a person skilled in the art within the technical scope disclosed in at least one embodiment shall fall within the protection scope of the claims. Therefore, the protection scope of at least one embodiment shall be subject to the protection scope of the claims.

What is claimed is:

1. A direct link setup method, applied to a first device, wherein the first device comprises one or more stations (STAs) and is a first non-access point (AP) multi-link device (MLD), the first device is connected to a third device, the third device comprises a plurality of APs and is an AP MLD, a second device is connected to the third device, the second device comprises a plurality of STAs and is a second non-AP MLD, and the method comprises:

determining at least two tunneled direct-link setup (TDLS) discovery request frames, wherein at least one of the at least two TDLS discovery request frames includes a first data unit and an identifier field indicating an address of an AP in the third device that corresponds to a target link, wherein the first data unit has an address configuration that includes an address of a STA of the first device, an address of a STA of the second device, and an address of an AP of the third device, and wherein the target link is a direct link between the STA of the first device and the STA of the second device via the AP of the third device, and different TDLS discovery request frames one-to-one correspond to different APs in the third device; and sending the at least two TDLS discovery request frames.

2. The method according to claim 1, wherein the determining the at least two TDLS discovery request frames that includes the identifier field includes determining at least two TDLS discovery request frames that includes the identifier field that is a basic service set identifier (BSSID), and the BSSID is carried in a link identifier element field of the at least two TDLS discovery request frames.

3. The method according to claim 1, wherein the determining the at least two TDLS discovery request frames includes determining the at least two TDLS discovery request includes a multi-link element field, the multi-link element field includes a type subfield, and the type subfield indicates tunneled direct-link setup.

4. The method according to claim 1, wherein the determining the at least two TDLS discovery request frames includes determining the at least two TDLS discovery request frames include a multi-link element field, the multi-link element field includes an MLD MAC address field, and the MLD MAC address field indicates a MAC address of the third device.

5. The method according to claim 1, further comprising receiving, by the first device, a TDLS discovery response frame fed back by a STA that is associated with the AP of the third device and that is in the plurality of STAs of the second device.

6. The method according to claim 1, wherein the method further comprises:

binding a MAC address of the third device to a TDLS peer key TPK.

7. A first device, wherein the first device comprises one or more stations (STAs) and is a first non-AP multi-link device (MLD), the first device is connected to a third device, the third device comprises a plurality of access points (APs) and is an AP MLD, a second device is connected to the third device, the second device comprises a plurality of STAs and is a second non-AP MLD, and the first device comprising:

a memory storage including instructions; and one or more processors in communication with the memory, wherein the one or more processors execute the instructions to:

determine at least two tunneled direct-link setup (TDLS) discovery request frames, wherein at least one of the at least two TDLS discovery request frames includes a first data unit and an identifier field indicating an address of an AP in the third device that corresponds to a target link, wherein the first data unit has an address configuration that includes an address of a STA of the first device, an address of a STA of the second device, and an address of an AP of the third device, and wherein the target link is a direct link between the STA of the first device and the STA of the second device via the AP of the third device, and different TDLS discovery request frames one-to-one correspond to different APs in the third device; and send the at least two TDLS discovery request frames.

8. The first device according to claim 7, wherein the identifier field is a basic service set identifier (BSSID), and the BSSID is carried in a link identifier element field of the at least two TDLS discovery request frames.

9. The first device according to claim 7, wherein the at least two TDLS discovery request frames include a multi-link element field, the multi-link element field includes a type subfield, and the type subfield indicates tunneled direct-link setup.

10. The first device according to claim 7, wherein the at least two TDLS discovery request frames include a multi-link element field, the multi-link element field includes an MLD MAC address field, and the MLD MAC address field indicates a MAC address of the third device.

11. The first device according to claim 7, wherein a transceiver unit is further configured to receive at least two TDLS discovery response frames fed back by a STA that is associated with the AP of the third device and that is in the plurality of STAs of the second device.

12. The first device according to claim 7, wherein a MAC address of the third device is bound to a TDLS peer key TPK.

13. A non-transitory computer-readable media storing computer instructions, wherein the non-transitory computer-readable media applied in a first device, the first device comprises one or more stations (STAs) and is a first non-access point (AP) multi-link device (MLD), the first device is connected to a third device, the third device comprises a plurality of APs and is an AP MLD, a second device is connected to the third device, the second device comprises a plurality of STAs and is a second non-AP MLD, wherein the non-transitory computer-readable media that in response to being executed by one or more processors, cause the one or more processors to perform the steps of:

determine at least two tunneled direct-link setup (TDLS) discovery request frames, wherein at least one of the at least two TDLS discovery request frames includes a first data unit and an identifier field indicating an address of an AP in the third device that corresponds to a target link, wherein the first data unit has an address configuration that includes an address of a STA of the first device, an address of a STA of the second device, and an address of an AP of the third device, and wherein the target link is a direct link between the STA of the first device and the STA of the second device via the AP of the third device, and different TDLS discovery request frames one-to-one correspond to different APs in the third device; and send the at least two TDLS discovery request frames.

14. The non-transitory computer-readable media according to claim 13, wherein the determining the at least two TDLS discovery request frames includes the identifier field includes determining the at least two TDLS discovery request frames includes the identifier field that is a basic service set identifier (BSSID), and the BSSID is carried in a link identifier element field of the at least two TDLS discovery request frames.

15. The non-transitory computer-readable media according to claim 13, wherein the determining the at least two TDLS discovery request frames includes determining the at least two TDLS discovery request includes a multi-link element field, the multi-link element field comprises a type subfield, and the type subfield indicates tunneled direct-link setup.

16. The non-transitory computer-readable media according to claim 13, wherein the determining the at least two TDLS discovery request frames includes determining the at least two TDLS discovery request frames include a multi-link element field, the multi-link element field comprises an MLD MAC address field, and the MLD MAC address field indicates a MAC address of the third device.

17. The non-transitory computer-readable media according to claim 13, further comprising receiving, by a transceiver unit, at least two TDLS discovery response frames fed back by a STA that is associated with the AP of the third device and that is in the plurality of STAs of the second device.

18. The non-transitory computer-readable media according to claim 16, wherein the determining the at least two TDLS discovery request frames include the multi-link element field includes determining the multi-link element field includes a MAC address of the third device that is bound to a TDLS peer key TPK.

* * * * *